(12) United States Patent
Takasaki

(10) Patent No.: US 11,442,675 B2
(45) Date of Patent: Sep. 13, 2022

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Tetsuhide Takasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/128,598

(22) Filed: Dec. 21, 2020

(65) Prior Publication Data
US 2021/0200489 A1    Jul. 1, 2021

(30) Foreign Application Priority Data
Dec. 27, 2019    (JP) .............................. JP2019-239152

(51) Int. Cl.
*G06F 3/12*    (2006.01)

(52) U.S. Cl.
CPC ............ *G06F 3/1247* (2013.01); *G06F 3/125* (2013.01); *G06F 3/1253* (2013.01); *G06F 3/1285* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,058,140 B2 * | 6/2015 | Kurata | ................ | G06F 3/1255 |
| 2002/0051169 A1 * | 5/2002 | Nishikawa | ........... | G06K 15/025 |
| | | | | 358/1.15 |
| 2009/0040547 A1 * | 2/2009 | Ferlitsch | ............... | G06F 3/1258 |
| | | | | 358/1.15 |
| 2010/0231960 A1 * | 9/2010 | Kurata | ............... | G06K 15/4065 |
| | | | | 358/1.15 |
| 2011/0242564 A1 * | 10/2011 | Armstrong | ............ | G06F 3/1288 |
| | | | | 358/1.14 |
| 2012/0236329 A1 * | 9/2012 | Kobayashi | ......... | G06K 15/1805 |
| | | | | 358/1.6 |
| 2013/0044335 A1 * | 2/2013 | Kobayashi | .............. | G06F 3/125 |
| | | | | 358/1.2 |
| 2014/0002848 A1 * | 1/2014 | Matsumae | ............ | G06F 3/1238 |
| | | | | 358/1.14 |
| 2015/0029535 A1 * | 1/2015 | Kondoh | ................ | G06F 3/1238 |
| | | | | 358/1.14 |
| 2015/0242173 A1 | 8/2015 | Kurata et al. | | |
| 2018/0210684 A1 * | 7/2018 | Kato | ..................... | G06F 3/1292 |
| 2020/0409620 A1 * | 12/2020 | Alacar | .................... | H04L 63/20 |
| 2021/0141578 A1 * | 5/2021 | Naganuma | ............ | G06F 3/1227 |

FOREIGN PATENT DOCUMENTS

WO    2013/116704 A1    8/2013

* cited by examiner

*Primary Examiner* — Helen Zong
(74) *Attorney, Agent, or Firm* — Venable LLP

(57) ABSTRACT

A method of controlling an information processing apparatus to convert data received from a first print module into data appropriate for a print apparatus not supporting the first print module comprises the steps of obtaining first print data and first print setting from the first print module as a first obtainment step, and changing the first print data and the first print setting according to whether the first print data is raster data or vector data and whether or not the first print setting includes setting of collation printing for printing in a collated manner. Data based on the changed first print data and first print setting is output to the print apparatus.

19 Claims, 24 Drawing Sheets

```
->
[Operation]
Get-Printer-Attributes
[Requested Attributes]
'copies-supported','document-format-supported', 'media-source-supported',
'media-col-database', 'media-supported', 'media-default','media-type-supported',
'sides-supported', 'sides-default', 'multiple-document-handling-supported'

<-
[Printer Attributes]
copies-supported=1-255
document-format-supported='application/pdf','image/pwg-raster'
media-source-supported='main'
media-col-database=
{ media-key='iso_a4_210x297mm'
  media-size={ x-dimension=21000 y-dimension=29700 }
  media-bottom-margin=400 media-left-margin=400
  media-right-margin=400 media-top-margin=400 },
{ media-key='na_letter_8.5x11in'
  media-size={ x-dimension=21590 y-dimension=27940 }
  media-bottom-margin=400 media-left-margin=400
  media-right-margin=400 media-top-margin=400 }
media-supported='iso_a4_210x297mm','na_letter_8.5x11in'
media-default='iso_a4_210x297mm'
media-type-supported='stationery','photo'
sides-supported='one-sided'
sides-default='one-sided'
multiple-document-handling-supported='separate-documents-collated-copies'
```

```
->
[Operation]
Create-Job
[Job Attributes]
 •
 •
 •
media-col=
{ media-size={ x-dimension=21000 y-dimension=29700 }
   media-bottom-margin=400 media-left-margin=400
   media-right-margin=400 media-top-margin=400
   media-source='main' media-type-supported='stationery' }
sides='one-sided'
multiple-document-handling='separate-documents-collated-copies'
copies=2
 •
 •
 •

->
[Operation]
Send-Document
[Operation Attributes]
 •
 •
 •
document-format='application/pdf'
 •
 •
 •
```

FIG.7

```
->
[Operation]
Create-Job
[Job Attributes]
  •
  •
  •
media-col=
{ media-size={ x-dimension=21000 y-dimension=29700 }
  media-bottom-margin=400 media-left-margin=400
  media-right-margin=400 media-top-margin=400
  media-source='main' media-type-supported='stationery' }
sides='one-sided'
multiple-document-handling='separate-documents-uncollated-copies'
copies=2
  •
  •
  •

->
[Operation]
Send-Document
[Operation Attributes]
  •
  •
  •
document-format='application/pdf'
  •
  •
  •
```

```
->
[Operation]
Create-Job
[Job Attributes]
 •
 •
 •
media-col=
{ media-size={ x-dimension=21000 y-dimension=29700 }
  media-bottom-margin=400 media-left-margin=400
  media-right-margin=400 media-top-margin=400
  media-source='main' media-type-supported='stationery' }
sides='one-sided'
multiple-document-handling='separate-documents-collated-copies'
copies=1
 •
 •
 •

->
[Operation]
Send-Document
[Operation Attributes]
 •
 •
 •
job-impressions=2
document-format='image/pwg-raster'
 •
 •
 •
```

FIG.11

```
->
[Operation]
Create-Job
[Job Attributes]
 •
 •
 •
media-col=
{ media-size={ x-dimension=21000 y-dimension=29700 }
  media-bottom-margin=400 media-left-margin=400
  media-right-margin=400 media-top-margin=400
  media-source='main' media-type-supported='stationery' }
sides='one-sided'
multiple-document-handling='separate-documents-uncollated-copies'
copies=1
 •
 •
 •

->
[Operation]
Send-Document
[Operation Attributes]
 •
 •
 •
job-impressions=2
document-format='image/pwg-raster'
 •
 •
 •
```

PRINT SETTING (1700)

- 1701 PRINTER: COMPANY C Printer 2
- 1702 NUMBER OF COPIES: 1
- 1703 ☑ TWO-SIDED ⦿ LONG-EDGE BINDING ○ SHORT-EDGE BINDING
- 1704 PAGE: ⦿ ALL
- 1705 ○ START: 1 END: 1
- 1706 ☑ COLLATION
- 1707 SHEET SIZE: A4
- 1708 SHEET TYPE: PLAIN PAPER
- 1709 CANCEL
- 1710 PRINT

1800

```
->
[Operation]
Get-Printer-Attributes
[Requested Attributes]
'copies-supported','document-format-supported', 'media-source-supported',
'media-col-database', 'media-supported', 'media-default','media-type-supported',
'sides-supported', 'sides-default', 'multiple-document-handling-supported'

<-
[Printer Attributes]
copies-supported=1-255
document-format-supported='application/pdf','image/pwg-raster'
media-source-supported='main'
media-col-database=
{ media-key='iso_a4_210x297mm'
  media-size={ x-dimension=21000 y-dimension=29700 }
  media-bottom-margin=400 media-left-margin=400
  media-right-margin=400 media-top-margin=400 },
{ media-key='na_letter_8.5x11in'
  media-size={ x-dimension=21590 y-dimension=27940 }
  media-bottom-margin=400 media-left-margin=400
  media-right-margin=400 media-top-margin=400 }
media-supported='iso_a4_210x297mm','na_letter_8.5x11in'
media-default='iso_a4_210x297mm'
media-type-supported='stationery','photo'
sides-supported='one-sided','two-sided-short-edge'
sides-default='one-sided'
multiple-document-handling-supported='separate-documents-collated-copies'
```

FIG.18

```
->
[Operation]
Create-Job
[Job Attributes]
 ·
 ·
 ·
media-col=
{ media-size={ x-dimension=21000 y-dimension=29700 }
   media-bottom-margin=400 media-left-margin=400
   media-right-margin=400 media-top-margin=400
   media-source='main' media-type-supported='stationery' }
sides='two-sided-long-edge'
multiple-document-handling='separate-documents-collated-copies'
copies=1
 ·
 ·
 ·

->
[Operation]
Send-Document
[Operation Attributes]
 ·
 ·
 ·
document-format='application/pdf'
 ·
 ·
 ·
```

```
->
[Operation]
Create-Job
[Job Attributes]
 .
 .
 .
media-col=
{ media-size={ x-dimension=21000 y-dimension=29700 }
  media-bottom-margin=400 media-left-margin=400
  media-right-margin=400 media-top-margin=400
  media-source='main' media-type-supported='stationery' }
sides='two-sided-long-edge'
multiple-document-handling='separate-documents-collated-copies'
copies=1
 .
 .
 .

->
[Operation]
Send-Document
[Operation Attributes]
 .
 .
 .
document-format='image/pwg-raster'
 .
 .
 .
```

FIG.22

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to a technique of changing print data and print setting between different print modules.

Description of the Related Art

As software for controlling a print apparatus, there has been generally known a system that uses a printer driver installed in a host computer. There has also been known a technique that allows an operating system (hereinafter, referred to as OS) to provide a standard printing function (hereinafter, referred to as OS-standard printing function) with no need of a printer driver of a vender who provides a print apparatus (International Publication No. WO2013/116704). The OS uses a specific protocol to receive the state of the print apparatus whether the print apparatus supports the OS-standard printing function, and transmits print data generated based on the setting by a user to the print apparatus.

However, it is impossible to use the OS-standard printing function in a print apparatus that does not support the OS-standard printing function. For this reason, there has been used an application called a print conversion utility to use the OS-standard printing function in a print apparatus not supporting the OS-standard printing function. This application includes therein the vender's own print system (hereinafter, referred to as print module) that is different from a print system (print module) provided by the OS, and interconverts a protocol used for the OS-standard printing function and a protocol unique to the print apparatus.

SUMMARY OF THE INVENTION

In an environment of using the print conversion utility, it is impossible to execute proper processing if the printing functions between two different print modules do not match each other.

A method of controlling an information processing apparatus according to an aspect of the present invention is a method of controlling an information processing apparatus configured to convert data received from a first print module into data appropriate for a print apparatus not supporting the first print module, including the steps of: obtaining first print data and first print setting from the first print module as a first obtainment step; obtaining capability of the print apparatus from the print apparatus as a second obtainment step; changing the first print data and the first print setting according to a type of the first print data, the first print setting, and the capability of the print apparatus; and converting the changed first print data and first print setting into data appropriate for the print apparatus to output the data to the print apparatus.

Further features of the present invention will become apparent from the following description of exemplary embodiments with reference to the attached drawings.

BRIEF DESCRIPTION OF THE DRAWINGS

FIG. 4 is a diagram illustrating an example of a request of settable printing information and an example of an answer thereto;

FIG. 7 is an example of print setting and print data that the print conversion utility receives from the OS print module;

FIG. 9 is an example of print setting and print data that the print conversion utility receives from the OS print module;

FIG. 11 is an example of print setting and print data that the print conversion utility obtains;

FIG. 15 is a diagram illustrating an example of print setting and print data that the print conversion utility obtains from the OS print module;

FIG. 17 is an example of a print setting screen that the OS print module provides to the application;

FIG. 18 is an example of settable printing information that the print conversion utility answers;

FIG. 19 is an example of print setting and print data that the print conversion utility receives from the OS print module;

FIG. 22 is an example of print setting and print data that the print conversion utility receives from the OS print module;

DESCRIPTION OF THE EMBODIMENTS

Figure 1:
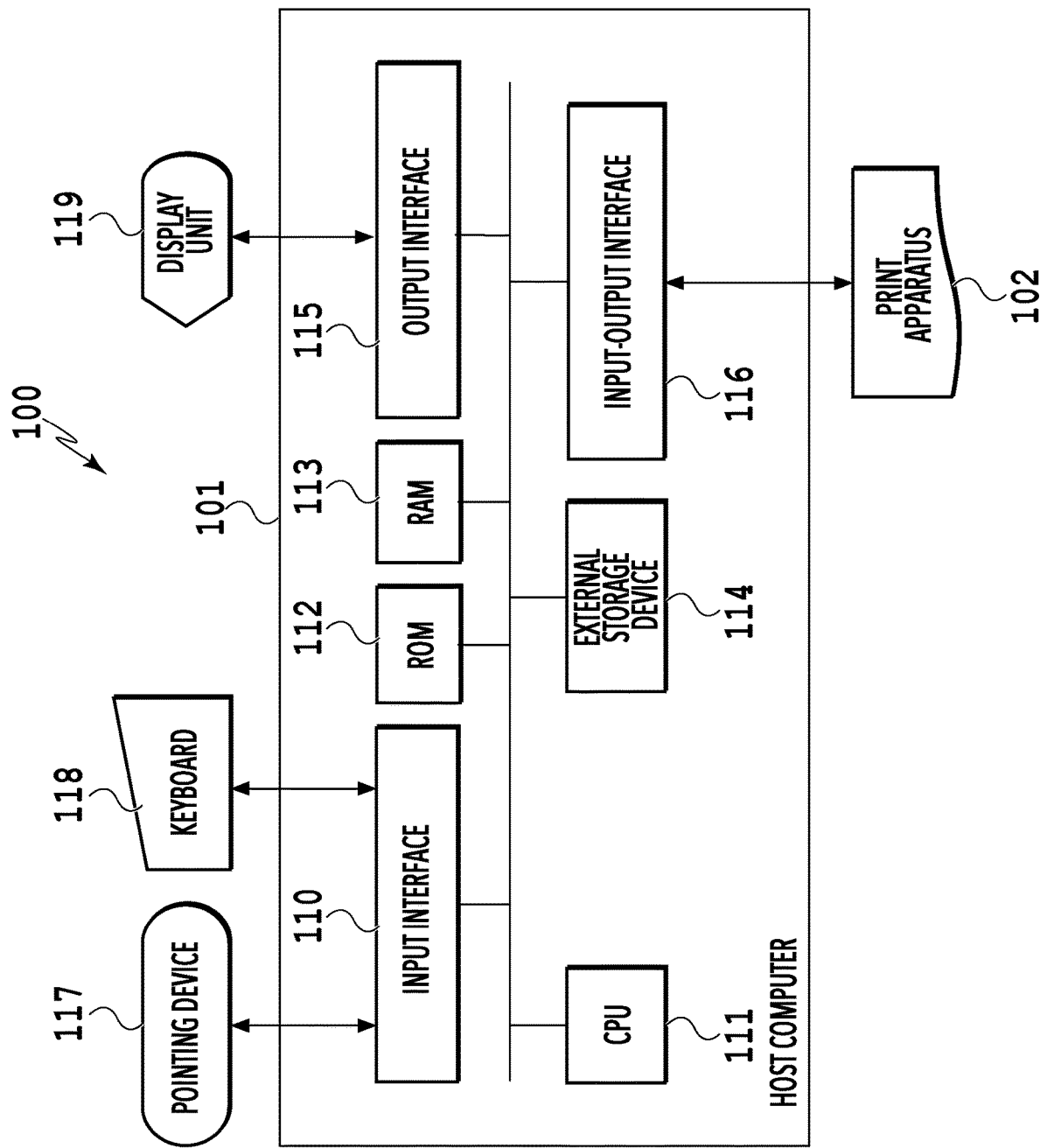
FIG. 1 is a block diagram illustrating a hardware configuration of a print system.

Hereinafter, embodiments of the present invention are described in detail. The following embodiments are examples for describing the present invention and are not intended to limit the present invention to merely the embodiments. Additionally, the present invention allows various modifications without departing from the gist. The same reference numerals are assigned to the same constituents, and the descriptions thereof are omitted.

First Embodiment

Hardware Configuration of Print System

FIG. 1 is a block diagram illustrating a hardware configuration of a print system 100 of this embodiment. In FIG. 1, a host computer 101 is an example of an information processing apparatus and include an input interface 110, a CPU 111, a ROM 112, a RAM 113, an external storage device 114, an output interface 115, and an input-output interface 116. The input interface 110 is connected to input devices such as a keyboard 118 and a pointing device 117, and the output interface 115 is connected to a display device such as a display unit 119.

The ROM 112 stores an initialization program, and the external storage device 114 stores a group of application programs, an operating system (OS), print data generation software, and other various kinds of data. The RAM 113 is used as a working memory or the like for execution of the various programs stored in the external storage device 114.

In this embodiment, the CPU 111 executes processing according to the procedure of the programs stored in the ROM 112 to execute the functions described below of the host computer 101 and the processing according to the flowcharts described below. A print apparatus 102 as a device is connected to the host computer 101 through the input-output interface 116. The configuration in this case includes the host computer 101 and the print apparatus 102 separated from each other; however, the host computer 101 and the print apparatus 102 may be formed as a single information processing apparatus. Here is described an example where the print apparatus is an ink jet printer that performs printing by ejecting ink onto a paper surface; however, the printing may be executed by another method (for example, by electrophotographic method). The host computer 101 may be a desktop personal computer, a smartphone, or a laptop personal computer. The display unit 119 may also be configured to operate as an input unit like a touch panel display. The host computer 101 and the print apparatus 102 may be connected to each other through a network, and a not-illustrated print server may be connected to the network.

Configuration of Print System

Figure 2:
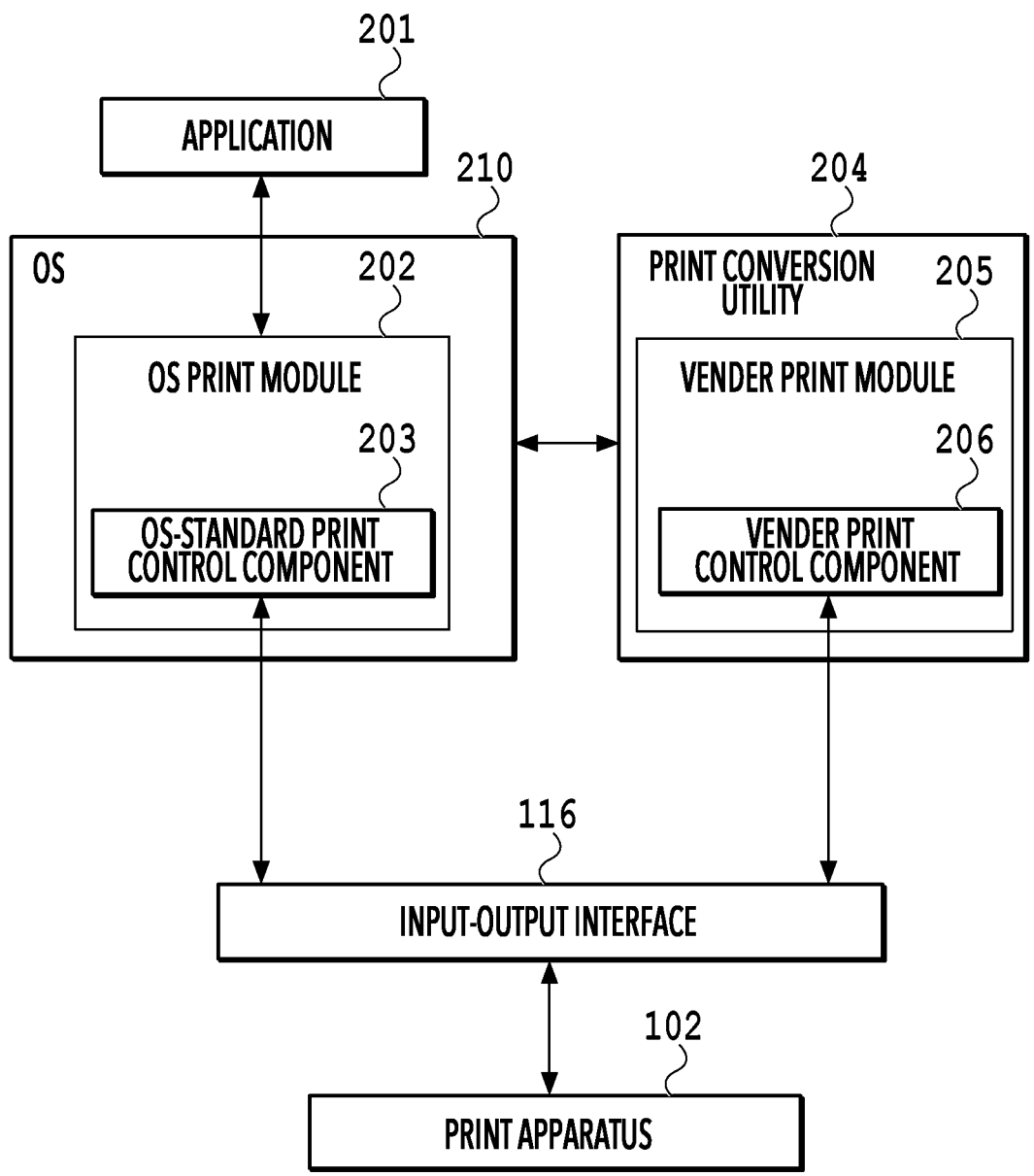
FIG. 2 is a block configuration diagram of the print system that performs printing using an OS-standard printing function.

FIG. 2 is a diagram schematically illustrating a configuration of a print system that performs printing using an OS-standard printing function. In this embodiment, here is described an example where the host computer 101 includes an OS print module 202 and a print conversion utility 204. The host computer 101 may include only the OS print module 202, and the print server connected to the host computer 101 through the network may include the print conversion utility 204.

An application 201 is software that creates contents to be printed. Examples of the application 201 may be a text creating application, a spreadsheet application, and so on. Once receiving a printing request from a user, the application 201 issues a printing instruction to an OS 210. Once receiving the printing instruction, the OS 210 entrusts the OS print module 202 to execute the processing of printing thereafter.

In this case, the OS print module 202 performs operations compliant with IPP Everywhere (registered trademark), which is known as a technique capable of performing printing with no need of a printer driver provided by a print apparatus vender. IPP Everywhere is not a module including a printer driver for a specific print apparatus 102 but is a standard print module that can be shared and used in multiple print apparatuses. The OS print module 202 cooperates with the application 201 and generates print data and print setting for performing printing in the print apparatus 102.

Description of Case where Print Apparatus Supports OS-Standard Printing Function First, a case where the print apparatus 102 supports the OS-standard printing function is described. In response to an instruction from the OS print module 202, an OS-standard print control component 203 communicates with the print apparatus 102 through the input-output interface 116 by using an OS-standard print protocol. In this case, the OS-standard print control component 203 executes the print processing according to a specification of a standard print protocol called the Internet Print Protocol (IPP) as the OS-standard print protocol. Additionally, the OS-standard print control component 203 uses a standard protocol called the Bonjour as a discover protocol for the print apparatus 102.

Once receiving the printing instruction from the application 201, the OS print module 202 provides a print setting screen to the application 201. The print setting screen is displayed on the display unit 119. The print setting screen is displayed according to information returned from the OS-standard print control component 203 to the OS print module 202. The print setting screen includes a list of available print apparatuses 102 supporting the OS-standard printing function, for example. The print setting screen is configured to display a printing function that can be set and the set value thereof according to settable printing information that can be set for each print apparatus 102. The print setting screen displays the printing functions that can be set, such as setting of the number of copies, setting of layout printing, setting of collation printing, and setting of two-sided printing, and the set values thereof. The settable printing information is information that the OS-standard print control component 203 obtains from the print apparatus 102 and provides to the OS print module 202. The printing functions and the set values displayed on the print setting screen are provided by the OS print module 202 according to the settable printing information.

While displaying the print setting screen, the OS print module 202 searches for a print apparatus 102 supporting the OS-standard printing function by using a discovery protocol Bonjour through the OS-standard print control component 203. In this case, the OS-standard print control component 203 obtains a list of a print apparatus 102 notifying of Service Instance Name of "_ipp._tcp,_print" as DNS Service Discovery. The OS-standard print control component 203 returns the print apparatus 102 on the list to the OS print module 202 to notify that this print apparatus 102 supports the OS-standard printing function. In a case where there are multiple print apparatuses 102 supporting the OS-standard printing function, the OS-standard print control component 203 returns a list of the multiple print apparatuses 102 to the OS print module 202.

The OS print module 202 displays the print apparatus 102 supporting the OS-standard printing function returned from the OS-standard print control component 203 on the print setting screen as a list. In this process, a print apparatus 102 at the top of the list is selected. The OS print module 202 requests the OS-standard print control component 203 to obtain the settable printing information of the print apparatus 102 selected on the print setting screen.

In response to the request from the OS print module 202, the OS-standard print control component 203 obtains the settable printing information from the print apparatus 102 by using the OS-standard print protocol IPP. While obtaining the settable printing information, the OS-standard print control component 203 requests Get-Printer-Attributes from the print apparatus 102 by using the IPP protocol. In response to this request, the print apparatus 102 returns Printer-Attributes to the OS-standard print control component 203. In the case of requesting Get-Printer-Attributes, the OS-standard print control component 203 may inquire about specific settable printing information or may inquire all kinds of settable printing information that the print apparatus 102 can set. The specific settable printing information includes a supported print data format.

Thus, while Get-Printer-Attributes is requested, the OS-standard print control component 203 requests the supported print data format. The print data format is used to determine a format of the print data generated by the OS print module 202 cooperating with the application 201. The OS print module 202 compliant with IPP Everywhere uses PWG Raster Format or Portable Document Format (PDF) as a print data format. In a case where the print apparatus 102 supports multiple print data formats, the OS print module 202 generates print data in any of the print data formats that is determined as an appropriate format by the OS print module 202 itself.

The OS print module 202 displays the print setting screen in response to the printing instruction from the application 201, and once the print setting is determined, the OS print module 202 generates print data. The OS print module 202 then transmits the print data and the print setting to the print apparatus 102 by using the IPP protocol through the OS-standard print control component 203. In this process, the print setting determined on the print setting screen is transmitted to the print apparatus 102 as print setting attribute information (Job Template Attributes) by the IPP protocol.

The print apparatus 102 performs printing on a paper surface based on the print data transmitted from the OS-standard print control component 203. In this process, the print apparatus 102 forms the print data on the paper surface with an operation according to the print setting attribute information. The print setting attribute information includes a print quality, designation of two-sided printing, and so on. For example, in a case where the print setting attribute information includes the designation of two-sided printing, the print apparatus 102 executes two-sided printing. The OS print module 202 allows the user to designate the printing function available in each print apparatus 102 depending on the print apparatuses 102 connected to the print system, through the OS-standard print control component 203. That is, even in a case where a print apparatus having a different printing function or a print apparatus developed by a different vender is connected, the OS print module 202 still allows the user to designate the available printing function depending on the print apparatus connected to the print system.

The above-described control is a control for a case where the print apparatus 102 is a device supporting the OS-standard printing function. In a case where the print apparatus 102 does not support the OS-standard printing function, the OS-standard print control component 203 cannot obtain the settable printing information from the print apparatus 102. In such a case, the print conversion utility 204 is used. Hereinafter, an example of using the print conversion utility 204 is described.

Description of Case where Print Apparatus Does Not Support OS-Standard Printing Function The print conversion utility 204 is a utility application that interconverts the OS-standard print protocol used by the OS-standard print control component 203 and a protocol unique to the print apparatus 102 used by the print apparatus 102. The print conversion utility 204 includes a vender print module 205, which is supported by the print conversion utility 204 itself, to cause the print apparatus 102 not supporting the OS-standard print protocol to perform printing. The vender print module 205 can search for the print apparatus 102 connected to the print system through the input-output interface 116 and obtain the settable printing information by using the protocol unique to the print apparatus 102 through a vender print control component 206.

In the activation, the print conversion utility 204 requests the vender print module 205 to search for the print apparatus not supporting the OS-standard print protocol. Once receiving this request, the vender print module 205 searches for the connected print apparatus 102 by using the protocol unique to the print apparatus 102 through the vender print control component 206. The protocol used for the searching may be not only the protocol unique to the print apparatus 102 but may also be a general discovery protocol like Bonjour described above. A discovery protocol capable of searching for the print apparatus 102 not supporting the OS-standard print protocol may be used. The vender print module 205 returns a list of the print apparatuses 102 not supporting the OS-standard print protocol discovered by the searching to the print conversion utility 204.

Out of the print apparatuses 102 not supporting the OS-standard print protocol included in the returned list, the print conversion utility 204 notifies of a print apparatus 102 supported by the print conversion utility 204 itself as a print apparatus supporting the OS-standard printing function. In other words, the print conversion utility 204 makes the notification so that the OS print module 202 can discover the print apparatus 102 as the print apparatus supporting the OS-standard printing function. This method of notification is performed by using the Bonjour protocol, for example. To be more specific, the print apparatus 102 supported by the print conversion utility 204 is notified as Service Instance Name of "_ipp._tcp,_print" as DNS Service Discovery.

The request of searching for the print apparatus not supporting the OS-standard print protocol from the print conversion utility 204 to the vender print module 205 may be executed not only in the activation. For example, the searching request may be made by the print conversion utility 204 at specific intervals. Additionally, the print conversion utility 204 may notify the vender print module 205 of information on the print apparatus 102 supported by itself. The vender print module 205 then may return only the print apparatus 102 supported by the print conversion utility 204 as a search result.

In a case where the print conversion utility 204 receives from the OS print module 202 a request of obtaining the settable printing information of the print apparatus that is notified as the print apparatus supporting the OS-standard printing function by the print conversion utility 204, the print conversion utility 204 performs the following operations. If there is a request of Get-Printer-Attributes of the print apparatus designated by the OS-standard print control component 203, the print conversion utility 204 executes processing of obtaining the settable printing information of the designated print apparatus. Specifically, the print conversion utility 204 requests the settable printing information of the designated print apparatus not supporting the OS-standard print protocol from the vender print module 205. The vender print module 205 obtains settable printing information that the print apparatus supports by using the protocol unique to the print apparatus 102 through the vender print control component 206 and returns the result to the print conversion utility 204.

In a case where, for example, the vender print module 205 has the settable printing information of the print apparatus 102 in a static data format, the settable printing information may be returned directly to the print conversion utility 204 without using the vender print control component 206. The print conversion utility 204 returns the settable printing information of the print apparatus obtained from the vender print module 205, the print apparatus not supporting the OS-standard print protocol and designated by the OS print module 202, to the OS print module 202.

The print conversion utility 204 also has a function of converting a print data format generated by the OS print module 202 to a print data format supported by the vender print module 205. With the print conversion utility 204 answering in behalf of the print apparatus not supporting the OS-standard print protocol or performing the print data format conversion, it is possible to allow the print apparatus not supporting the OS-standard print protocol to perform printing using the OS-standard printing function.

If the capability of the print apparatus not supporting the OS-standard print protocol and the print data and the print setting transmitted by the OS print module 202 according to the OS-standard print protocol do not match each other, there may be a case that proper processing is not executed. Hereinafter, an example where the print conversion utility 204 executes proper processing depending on the capability of the print apparatus not supporting the OS-standard print protocol and the print data and the print setting transmitted by the OS print module 202 according to the OS-standard print protocol is described.

Configuration of Print Setting Screen

Hereinafter, first, a print setting screen depending on the capability of the print apparatus is described. Specifically, a configuration of the print setting screen for a case where the print apparatus not supporting the OS-standard printing function is caused to perform printing using the OS-standard printing function is described. Hereinafter, the description is given with the assumption that a print apparatus not supporting the OS-standard printing function, "Company C Printer 1", supported by the print conversion utility 204 is connected to the print system.

Additionally, it is assumed that the print apparatus 102 has a capability of setting the following printing functions. (1) The print apparatus 102 has a function of accepting a designation of the number of copies and copying the designated number of copies of print data in the print apparatus. (2) The print apparatus 102 has a collation printing function and can perform a collation output in a unit of the designated number of copies but cannot perform an output of the designated number of copies in the order of pages if collation printing is not designated. (3) The print apparatus 102 does not have a two-sided printing function; therefore, the print apparatus 102 cannot accept designation of the two-sided printing function. (4) The print apparatus 102 supports sheet sizes of A4 and letter-size and has a function of receiving print data corresponding to the sheet sizes and performing printing for the sheet sizes. (5) The print apparatus 102 supports sheet types of plain paper and a photo sheet and has a function of performing printing on a paper surface of a designated type of sheet. (6) The print apparatus 102 includes only a main tray as a paper feed port.

First, the print conversion utility 204 makes notification so that the print apparatus not supporting the OS-standard printing function, "Company C Printer 1", can be discovered by the OS print module 202 as the print apparatus supporting the OS-standard printing function. The method of notification is made by the Bonjour protocol as described above. In a case where obtaining of settable printing information of the print apparatus not supporting the OS-standard printing function, "Company C Printer 1", is requested by the OS print module 202, the print conversion utility 204 answers on behalf of the print apparatus. The method of answering on behalf of the print apparatus includes to answer the settable printing information of the print apparatus not supporting the OS-standard printing function, "Company C Printer 1", by using the IPP protocol, as described above. Additionally, the following descriptions are given with the assumption that, in a case where the OS print module 202 inquiries about a print data format as the settable printing information, the print conversion utility 204 answers PWG Raster Format and PDF.

Once receiving the printing request from the user, the application 201 issues the printing instruction to the OS. Once receiving the printing instruction, the OS print module 202 provides the application 201 with the print setting screen configured to display the list of the available print apparatus supporting the OS-standard printing function and the print setting that can be set for the print apparatus and the set values thereof.

Figure 3:
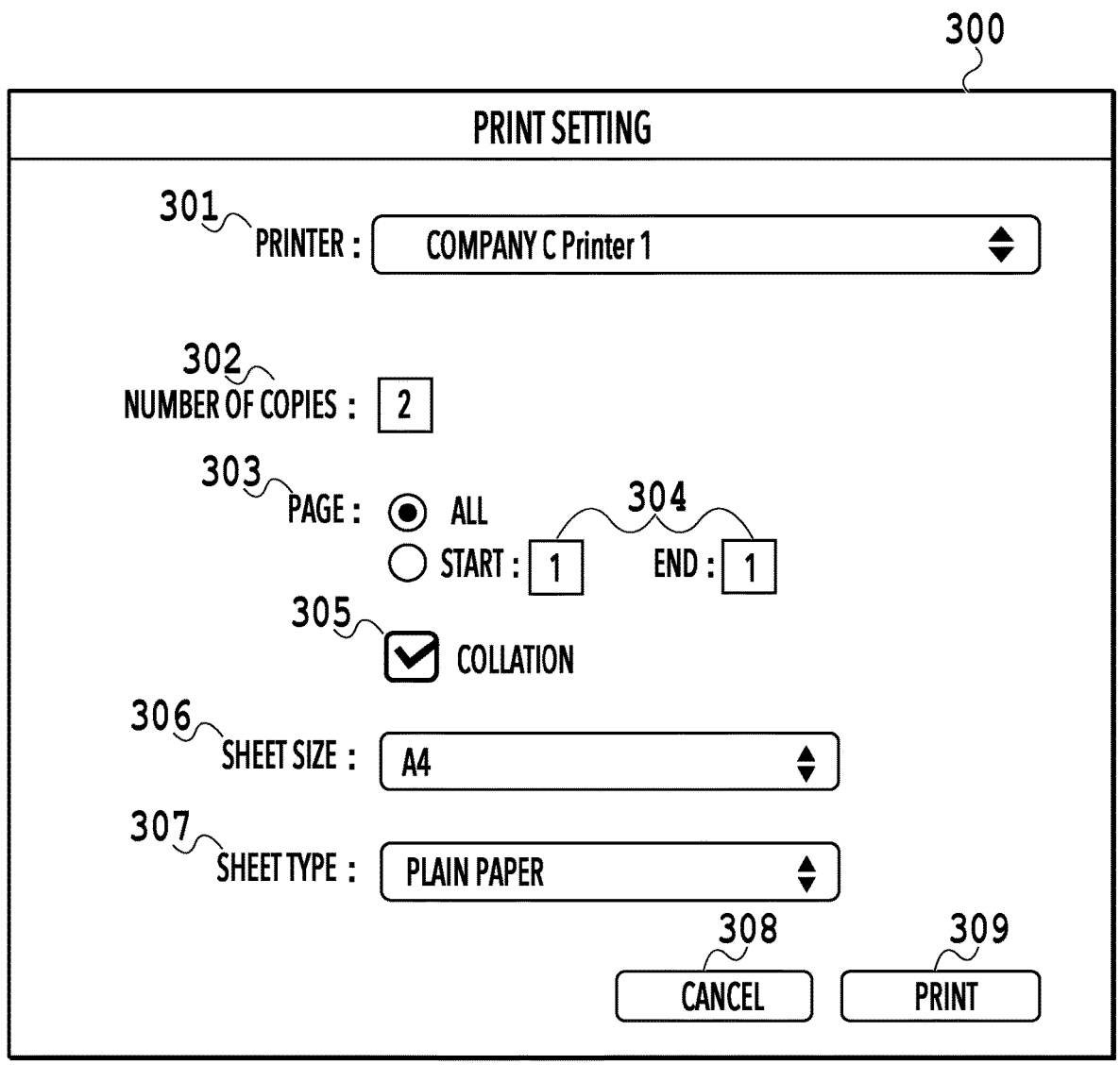
FIG. 3 is an example of a print setting screen provided by an OS print module to an application.

FIG. 3 is an example of the print setting screen that the OS print module 202 provides to the application 201. The OS print module 202 obtains the list of the available print apparatus supporting the OS-standard printing function from the OS-standard print control component 203. In this case, information of the single print apparatus called "Company C Printer 1" is obtained.

The OS print module 202 displays the print apparatus obtained from the OS-standard print control component 203 in a printer list 301 in a print setting dialogue 300 such that the print apparatus is being selected. Next, the OS print module 202 requests the settable printing information from the print apparatus selected in the printer list 301 by using the IPP protocol. In this case, the print conversion utility 204 answers the settable printing information of "Company C Printer 1" on behalf of the selected print apparatus.

Example of Settable Printing Information

FIG. 4 is a diagram illustrating an example 400 of the request of the settable printing information and the answer. FIG. 4 illustrates an example of a part of the request of the settable printing information of "Company C Printer 1" from the print conversion utility 204 by the OS print module 202. FIG. 4 also illustrates an example of operations and attribute data for the case where the print conversion utility 204 answers on behalf of the print apparatus 102. The OS print module 202 issues a Get-Printer-Attributes operation and requests the following attributes as the settable printing information.

(a) The OS print module 202 requests an attribute of how many number of copies of print data can be copied at most in the print apparatus. The attribute information corresponds to "copies-supported". (b) The OS print module 202 requests a print data format that the print apparatus supports. The attribute information corresponds to "document-format-supported". (c) The OS print module 202 requests a paper feed port that the print apparatus supports. The attribute information corresponds to "media-source-supported". (d) The OS print module 202 requests an aggregate of pieces of sheet information that the print apparatus supports. The aggregate of pieces of sheet information includes information such as a name of sheet size, a physical sheet size, and a blank size, and the attribute information corresponds to "media-col-database". (e) The OS print module 202 requests a sheet size that the print apparatus supports. The attribute information corresponds to "media-supported". (f) The OS print module 202 requests a default sheet size name of the print apparatus. The attribute information corresponds to "media-default". (g) The OS print module 202 requests a sheet type that the print apparatus supports. The attribute information corresponds to "media-type-supported". (h) The OS print module 202 requests a two-sided printing function that the print apparatus supports. The attribute information corresponds to "sides-supported". (i) The OS print module 202 requests a default two-sided printing function of the print apparatus. The attribute information corresponds to "sides-default". (j) The OS print module 202 requests a collation printing function that the print apparatus supports. The attribute information corresponds to "multiple-document-handling-supported".

In response to the requests of those attributes from the OS print module 202, the print conversion utility 204 answers the following as the attributes of the settable printing information of "Company C Printer 1" on behalf of the print apparatus.

(A) The print conversion utility 204 answers "1-255", which indicates that the print apparatus can print and copy 255 copies at most, to "copies-supported". (B) The print conversion utility 204 answers a print data format that the print apparatus supports to "document-format-supported". In this case, the print conversion utility 204 answers "application/pdf,image/pwg-raster", which indicates that the print apparatus supports print data formats of PDF and PWG-Raster Format. In this case, "Company C Printer 1" is a print apparatus not supporting the OS-standard printing function and does not support those print data formats; however, the print conversion utility 204 converts the formats to supported print data formats through the vender print module. (C) The print conversion utility 204 answers "main", which indicates that the print apparatus supports the main tray as a supported paper feed port, to "media-source-supported".

(D) The print conversion utility 204 answers the sheet size that the print apparatus supports to "media-col-database" as described below. The name of sheet size of A4-size that the print apparatus supports is answered as "iso_a4_210×297mm". The sheet of A4-size in a physical size is a width of 210 mm and a length of 297 mm. The physical size is expressed in terms of one hundredth mm and answered as "x-dimension=21000 y-dimension=29700". The print apparatus needs to provide blanks of 4 mm in four sides in the printing. The blank size is also expressed in terms of one hundredth mm and answered as "media-bottom-margin=400, media-left-margin=400, media-right-margin=400, and media-top-margin=400". This blank size is common between A4-size and letter-size, and the same answer is made for both A4-size and letter-size. The sheet size name of letter-size that the print apparatus supports is answered as "na_letter_8.5×11 in". The sheet of letter-size in the physical size is a width of 215.9 mm and a length of 279.4 mm. The physical size is expressed in terms of one hundredth and answered as "x-dimension=21590 y-dimension=27940". (E) The print conversion utility 204 answers "iso_a4_210×297 mm" and "na_letter_8.5×11 in" as the sheet sizes that the print apparatus supports to "media-supported".

(F) The print conversion utility 204 answers "iso_a4_210×297 mm", which indicates that the default sheet size of the print apparatus is A4-size, to "media-default". (G) The print conversion utility 204 answers "stationery,photo", which indicates that the sheet types that the print apparatus supports are plain paper and photo paper, to "media-type-supported". (H) The print conversion utility 204 answers "one-sided", which indicates that the print apparatus does not support two-sided printing and supports only one-sided printing, to "sides-supported". (I) The print conversion utility 204 answers "one-sided", which indicates that the print apparatus does not support the default two-sided printing function of print apparatus, to "sides-default".

(J) The print conversion utility 204 answers to indicate that the collation printing that the print apparatus supports is only the collation output in a unit of copies. In this process, "separate-documents-collated-copies" is answered to "multiple-document-handling-supported".

According to the thus-obtained attribute information, the OS print module 202 configures settable items for printing to be displayed in the print setting dialogue 300. A number-of-copies designation text box 302 is a control for performing printing of the designated number of copies that is configured according to the obtained "copies" attribute. A print page designation radio button 303 is a control related to designation of a page of print data generated by the cooperating OS print module 202 and application 201. If "all" is selected, print data of all the pages of the contents created by the application is generated. On the other hand, if a page range is designated, print data of the page range set in "start" and "end" of a page designation range text box 304 is generated.

A collation printing designation check box 305 is configured according to the obtained "multiple-document-handling-supported" attribute. The operation according to the collation printing designation is described later.

A sheet size designation list 306 is configured according to the obtained "media-supported" attribute. In this case, the sheet sizes of A4-size and letter-size are listed in the sheet size designation list 306, and the obtained "media-default" is being selected. In this case, A4-size is being selected in the sheet size designation list 306. A sheet type designation list 307 is configured according to the obtained "media-type-supported". Here, plain paper and photo paper are listed. In this case, plain paper corresponding to "stationery" that is returned first to the "media-type-supported" attribute is being selected in the sheet type designation list 307.

In this embodiment, since the print apparatus 102 does not support the two-sided printing function, the print setting dialogue 300 does not display a control of two-sided printing. A cancel button 308 is a control of canceling the printing instruction, and once the user presses the cancel button 308, the OS print module 202 hides the print setting dialogue 300, and the process returns to the processing of the application 201. A print button 309 is a control of instructing the print apparatus to perform printing with the print setting designated by the controls in the print setting dialogue 300. Once the user presses the print button 309, the OS print module 202 cooperates with the application 201 to generate print data and print setting based on the determined print setting, and printing is performed in the print apparatus through the print conversion utility 204.

Example of Printing Multiple Pages

A method of allowing the print apparatus not supporting the OS-standard printing function to print contents including multiple pages using the OS-standard printing function is described.

Figure 5:
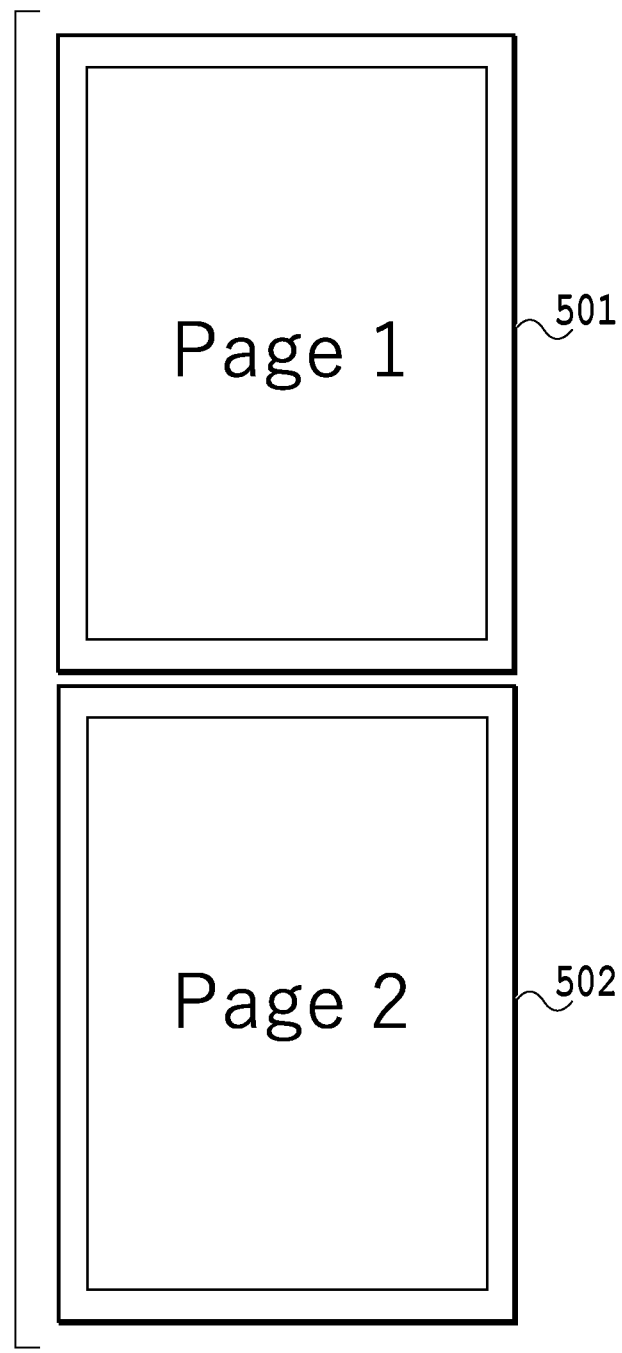
FIG. 5 is an example of print contents created by the application.

FIG. 5 illustrates two pages of contents created by the application 201 that include contents 501 on the first page and contents 502 on the second page. It is assumed that those contents are created by the application 201, and then the print button 309 in the print setting dialogue 300 is pressed.

The OS print module 202 generates print data according to the "document-format-supported" attribute answered by the print conversion utility 204 on behalf of the print apparatus. In a case where there are multiple supported print data formats like this embodiment, the OS print module 202 may generate the print data in a print data format that is determined as an appropriate format by the OS print module 202 itself depending on the designation by the application 201 or the designation by the OS 210. For example, in a case where printing of image data such as a photo can be recognized in advance, the OS print module 202 may generate the print data in PWG Raster Format, which is a raster data format. On the other hand, in a case where printing of data such as texts or a drawing can be recognized in advance, the OS print module 202 may generate the print data in a PDF format, which is a vector data format.

If the print conversion utility 204 according to this embodiment is not used, there may be a case where improper processing for the printing of the contents including multiple pages may be executed by the print apparatus 102 not supporting the OS-standard printing function. Specifically, processing that causes an increase in a processing load or occupation of a storage region may be executed. Additionally, collation printing in a form desired by the user may not performed.

Description of Comparative Example

First, processing in a case of using a print conversion utility not according to this embodiment is described as a comparative example. With the print conversion utility of the comparative example, processing of the vender print module 205 that generates data to cause the print apparatus 102 to perform printing using the print data and the print setting received from the OS print module 202 is executed. That is, unlike the print conversion utility 204 of this embodiment described later, generation processing according to the printing capability of the print apparatus 102 is not executed. For example, in a case where FIG. 5 is raster data and printing of multiple number of copies is designated, the OS print module 202 transmits raster data expanded to the number of the multiple number of copies. In this process, with the print conversion utility of the comparative example, processing of the vender print module that generates data to cause the print apparatus 102 to perform printing by using the raster data expanded to the number of the designated number of copies is executed. However, in a case where the print apparatus has a function of copying the designated number of copies of print data in the print apparatus, it is possible to obtain the same print result if the multiple number of copies of the same raster data are copied in the print apparatus. That is, with the print conversion utility of the comparative example, the print apparatus may have a higher communication load than that in the case of receiving print data before the expansion, and this may cause a degradation in the performance of printing. Additionally, the storage region of the print apparatus is more occupied by the amount of the expanded data. This is the example of executing the processing that causes an increase in the processing load and occupation of the storage region.

Next, a comparative example where collation printing in a form desired by the user is not performed is described. First, collation printing is described simply. Collation printing (also referred to as collation output) is printing (output) performed in a unit of copies. For example, here is assumed that two copies of contents including a first page and a second page are printed. In this case, if collation printing is performed, the print apparatus performs printing in the order of a first page of the first copy, a second page of the first copy, a first page of the second copy, and a second page of the second copy. That is, printing is performed in a unit of copies. On the other hand, in a case where collation printing is not performed, printing of multiple number of copies is performed in the order of pages. For example, in the above-described example, printing is performed in the order of the first page of the first copy, the first page of the second copy, the second page of the first copy, and the second page of the second copy.

In a case of using the OS-standard printing function, the OS print module 202 during the printing of the designated number of copies may generate print data while assuming that the print apparatus can achieve both the collation printing in a unit of the designated number of copies and the printing of multiple number of copies designated in the order of pages. On the other hand, some of the print apparatuses can execute collation printing but cannot execute printing of multiple number of copies designated in the order of pages. As described above, the print apparatus of this embodiment has the collation printing function and can perform the collation output in a unit of the designated number of copies. However, if collation printing is not designated, the print apparatus cannot perform an output by printing of multiple number of copies designated in the order of pages. Thus, the print apparatus that cannot copy print data of multiple number of copies in the order of pages in the print apparatus is incapable of properly processing the setting of the print apparatus supporting the collation output in the vender print module and is incapable of obtaining a desired output result. That is, an output by the collation printing may be performed although print data in which collation printing is not designated (collation printing OFF) is transmitted by the OS print module 202. The OS print module 202 obtains "separate-documents-collated-copies" from the print conversion utility as the settable printing information. Accordingly, the collation printing designation check box 305 is displayed in the print setting dialogue 300 of FIG. 3. The above-described phenomenon may occur if printing is instructed without checking the collation printing designation check box 305.

To deal with this, the print conversion utility 204 of this embodiment executes processing of inhibiting the improper processing in a case of printing the contents including multiple pages.

Description of Flowchart of Present Embodiment

Figure 6:
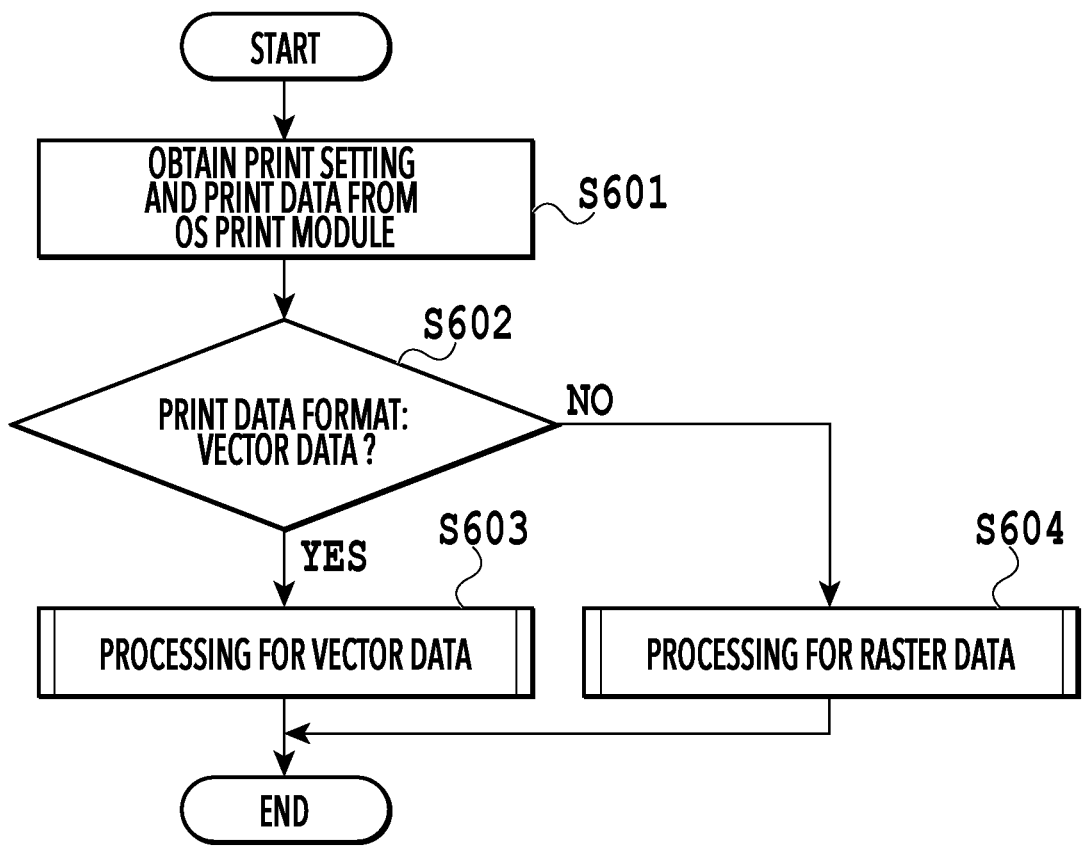
FIG. 6 is a flowchart of data processing by a print conversion utility.

FIG. 6 is a flowchart indicating an example of processing of interconverting the OS-standard print protocol and the protocol unique to the print apparatus 102 executed by the print conversion utility 204. Hereinafter, there is described processing that allows the print apparatus 102 to output a desired output result with proper print setting regardless of whether the print apparatus has the function of copying the designated number of copies in the print apparatus and whether the print apparatus has the collation output function. The processing indicated in FIG. 6 is implemented with the CPU 111 executing the program of the print conversion utility 204 stored in the ROM 112 or the external storage device 114.

In S601, the print conversion utility 204 obtains print setting and print data from the OS print module 202.

FIG. 7 illustrates an example 700 of the print setting and the print data that the print conversion utility 204 receives from the OS print module 202 by using the OS-standard print protocol. The print setting is written in print job attribute information that is called Job Template during a Create-Job operation. The print data is transmitted during a Send-Document operation, and a print data format is written in document-format as an operation attribute.

The print conversion utility 204 obtains the following print settings during the Create-Job operation. (J1) The print conversion utility 204 obtains sheet information for the printing by the print apparatus from the media-col attribute. In this case, the print conversion utility 204 obtains the sheet information indicating use of A4-size as the sheet size, the main tray as the paper feed port, and plain paper as the sheet type, as described above. (J2) The print conversion utility 204 obtains setting of one-side printing from the sides attribute. (J3) The print conversion utility 204 obtains setting of performing collation printing from the multiple-document-handling attribute. (J4) The print conversion utility 204 obtains setting of copying two copies of print data in the print apparatus from the copies attribute.

The print conversion utility 204 obtains the print data during the Send-Document operation. During the obtainment of the print data, the print conversion utility 204 can grasp the format of the print data from document-format as an operation attribute. In this case, the print conversion utility 204 grasps that the format of the print data is PDF.

In S602, the print conversion utility 204 makes a determination on the format of the print data obtained in S601. If the format of the print data is a vector data format such as PDF, the process proceeds to S603 for the processing for vector data, and if the format of the print data is a raster data format such as PWG-Raster, the process proceeds to S604. In the case of the example in FIG. 7, the format of the print data is PDF in a vector data format. Accordingly, the process proceeds to S603.

Processing for Case of Vector Data Format

Figure 8:
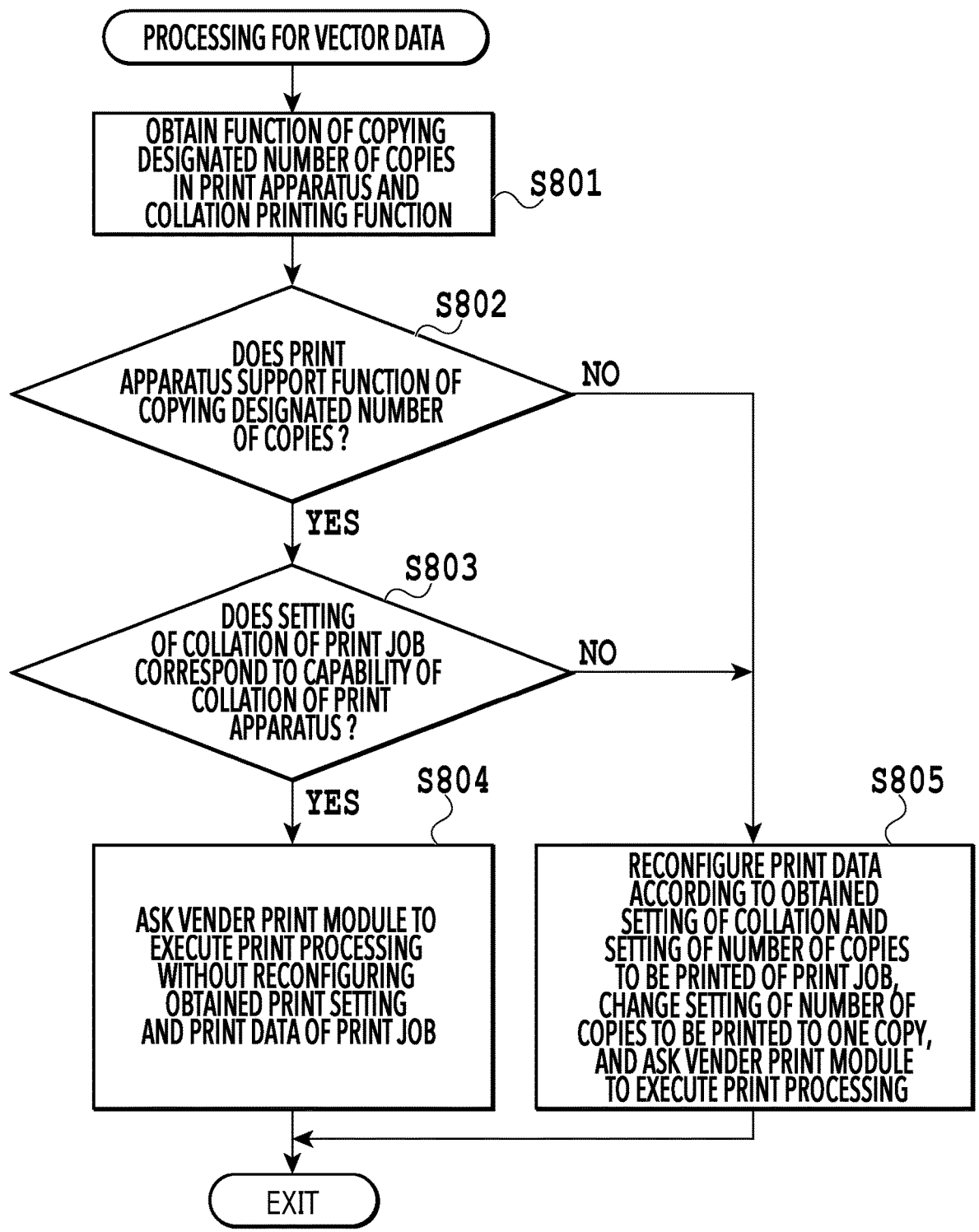
FIG. 8 is a flowchart of processing for vector data by the print conversion utility.

FIG. 8 is a flowchart indicating the processing for vector data in S603. In S801, the print conversion utility 204 obtains the function of copying the designated number of copies in the print apparatus and the collation output function. The obtainment of the printing functions uses the information obtained during the requesting by the OS print module 202 described above. In this case, the print conversion utility 204 obtains that the print apparatus supports the function of copying the designated number of copies in the print apparatus and also supports the function of collation output in a unit of the number of copies.

Next, in S802, the print conversion utility 204 determines whether the print apparatus supports the function of copying the designated number of copies. If the print apparatus supports the function of copying the designated number of copies, the process proceeds to S803, and if the print apparatus does not support the function, the process proceeds to S805. In this example, the process proceeds to S803 since the print apparatus has the function of copying the designated number of copies in the print apparatus.

In S803, the print conversion utility 204 determines whether the collation setting of the print job obtained from the OS print module 202 is a function that the print apparatus can process. If the collation setting of the print job obtained from the OS print module 202 is a function that the print apparatus can process, the process proceeds to S804, and if it is not, the process proceeds to S805. In this example, the process proceeds to S804 since the collation setting of the print job is setting of performing collation printing, and the print apparatus has the function of collation printing in a unit of copies.

In S804, the print conversion utility 204 asks the vender print module 205 to execute the print processing without reconfiguring the print setting and the print data of the print job obtained from the OS print module 202. The meaning of this processing is that processing of the the print setting and the print data from the OS print module 202 by the vender print module 205 allows the print apparatus 102 to execute the processing with proper setting. In other words, it means that the print system can perform printing while reducing a communication load during collation printing.

FIG. 9 is a diagram illustrating an example 900 of other print setting and print data. The other example is described with reference to FIG. 9. In this embodiment, in a case where the collation printing designation check box 305 in the print setting dialogue 300 is not checked, the print conversion utility 204 obtains the print setting and the print data of FIG. 9 from the OS print module 202. The print conversion utility 204 refers to the multiple-document-handling attribute and obtains the print setting of printing multiple number of copies in the order of pages without performing collation printing. In this case, as described above, the print apparatus 102 of this embodiment does not have the function of printing multiple number of copies in the order of pages. Accordingly, in S803 of the processing flowchart for vector data in FIG. 8, the print conversion utility 204 determines that the setting of collation printing of the print job does not correspond to the collation printing function of the print apparatus, and the process proceeds to S805.

In S805, the print conversion utility 204 reconfigures the print data according to the collation setting of the obtained print job and the setting of the designated number of copies to be printed, changes the setting of the number of copies to be printed to "1", and asks the vender print module 205 to execute the print processing.

Figure 10:
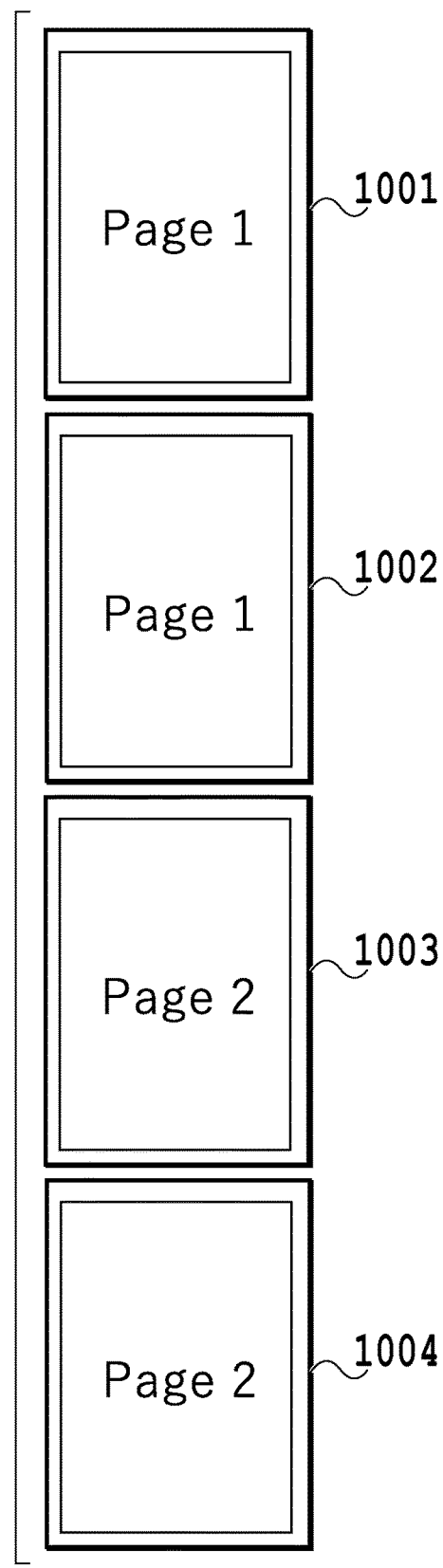
FIG. 10 is a diagram describing an example of reconfiguration of the print data.

FIG. 10 is a diagram describing an example of the print data in S805. In the processing of S805, first, print data for printing each page by two copies in the order of pages as illustrated in FIG. 10 is reconfigured (regenerated). Data 1001 is data of the first page obtained from the OS print module 202 and is data of the first page of the regenerated print data. Data 1002 is data of the first page obtained from the OS print module 202 and is data of the second page of the regenerated print data. Data 1003 is data of the second page obtained from the OS print module 202 and is data of the third page of the regenerated print data. Data 1004 is data of the second page obtained from the OS print module 202 and is data of the fourth page of the regenerated print data. Next, the print conversion utility 204 asks the vender print module 205 to execute the print processing by using the print data regenerated as the above-described four pages and the print setting in which the number of copies to be printed is changed from "2" to "1". In this way, it is possible to obtain an output result of printing of the designated number of copies in the order of pages by the print apparatus that does not have the function of printing the designated number of copies in the order of pages.

Here is described the example where the process proceeds to S805 and the processing is executed regardless of the number of copies to be printed and the number of pages of the print data. However, the phenomenon where the printing of multiple number of copies in the order of pages is not made if the setting of collation printing of the print job does not correspond to the collation printing function of the print apparatus occurs in a case where the number of copies to be printed is two or greater and the number of pages is two pages or greater. To deal with this, determination on whether the number of copies to be printed and the number of pages are both plural may be made, and the process may proceed to S805 if both the number of copies to be printed and the number of pages are plural.

Processing for Case of Raster Data Format

Next, an example where the OS print module 202 in this embodiment outputs print data in a print data format of a raster data format to the print conversion utility 204 is described.

FIG. 11 illustrates an example 1100 of the print setting and the print data that the print conversion utility 204 obtains in a case where the print setting dialogue 300 is in the state illustrated in FIG. 3, and the print button 309 is pressed. The OS print module 202 outputs print data in a print data format of a raster data format.

Figure 12:
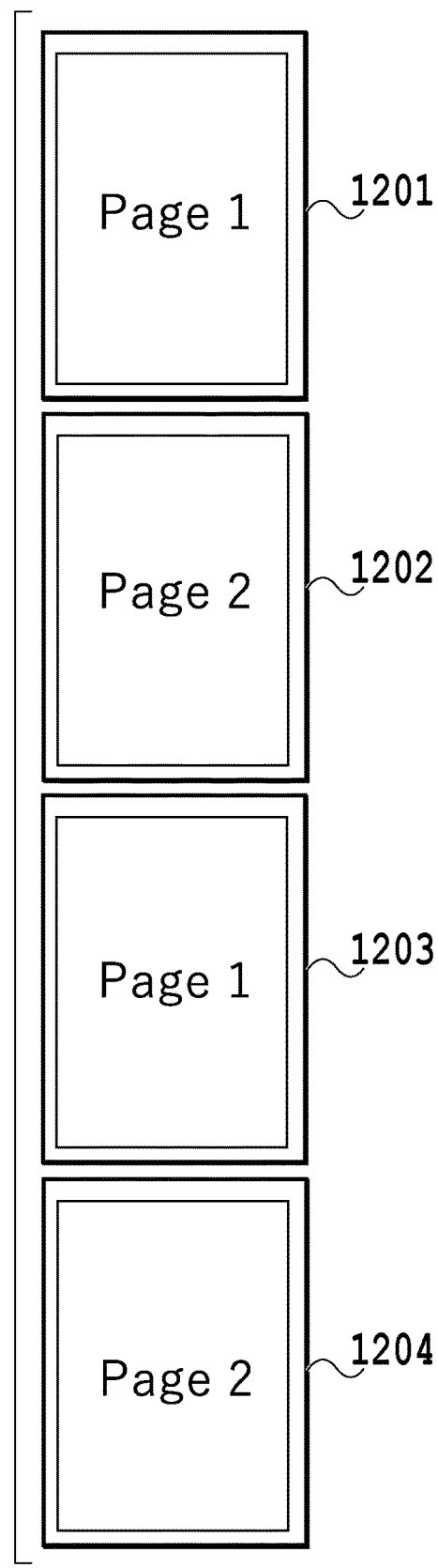
FIG. 12 is a diagram describing the print data.

FIG. 12 is a diagram describing the print data included in FIG. 11. As illustrated in FIG. 12, the print data is data expanded with the data of two pages being collated into two copies. Data 1201 is data of the first page of the contents generated by the cooperating application 201 and OS print module 202. Data 1202 is data of the second page of the contents generated by the cooperating application 201 and OS print module 202. Data 1203 is data of the first page of the contents generated by the cooperating application 201 and OS print module 202. Data 1204 is data of the second page of the contents generated by the cooperating application 201 and OS print module 202.

The print conversion utility 204 obtains the expanded print data including four pages in total from the OS print module 202. The print conversion utility 204 can obtain the number of print sides of a copy of the print data from job-impressions as an operation attribute. In the example of FIG. 11, the print conversion utility 204 obtains that the number of print sides of a copy of the print data is "2". In S602 described above, the print conversion utility 204 proceeds the process to S604 for the processing for raster data since the print data format is not a vector data format.

Figure 13:
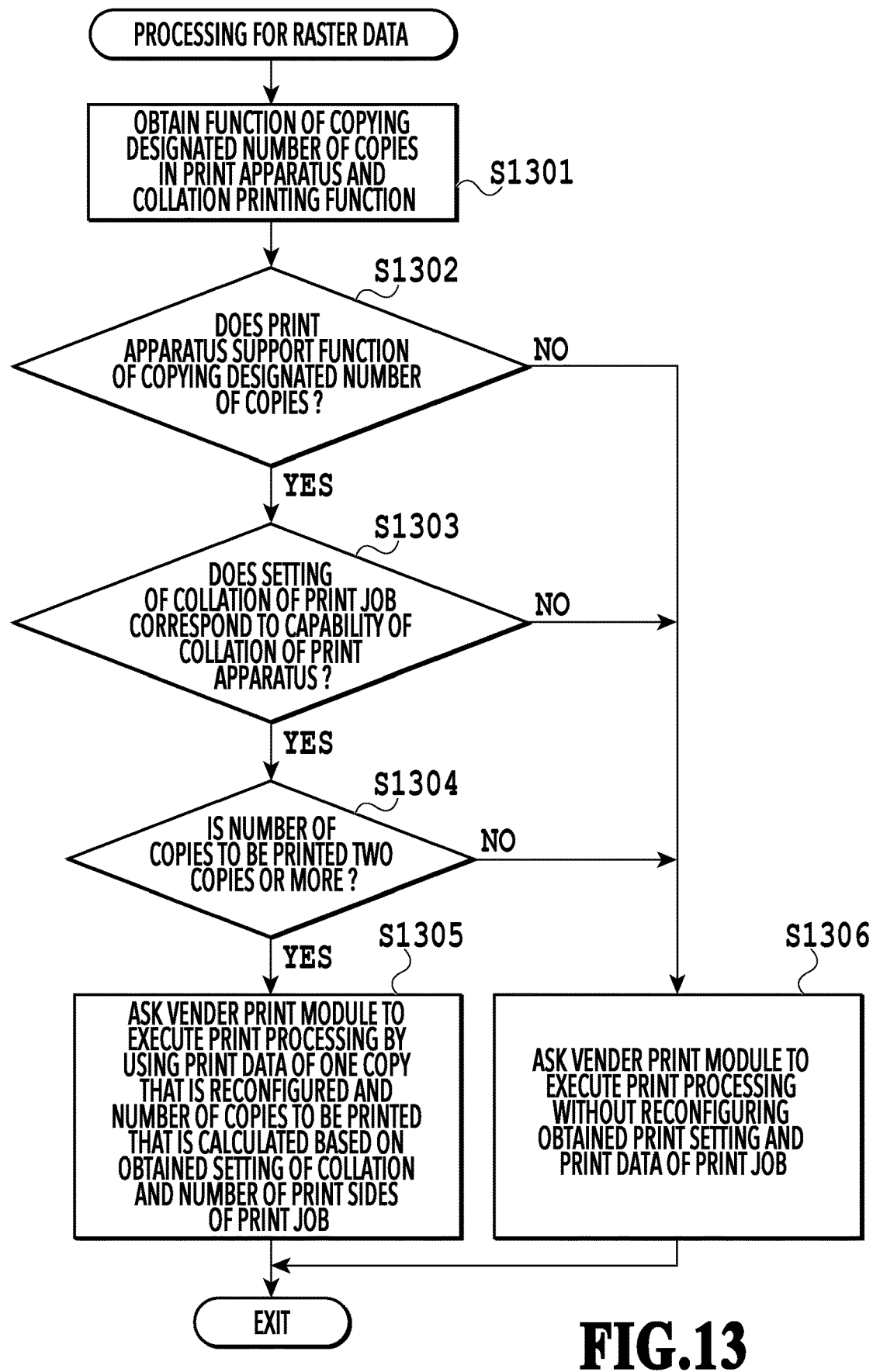
FIG. 13 is a flowchart of processing for raster data by the print conversion utility.

FIG. 13 is a processing flowchart for raster data. In S1301, the print conversion utility 204 obtains the function of copying the designated number of copies in the print apparatus 102 and the collation printing function. The obtainment of the printing function uses the information obtained during the requesting by the OS print module 202 described above. In this case, the print conversion utility 204 obtains that the print apparatus 102 supports the function of copying the designated number of copies in the print apparatus and also supports the function of collation printing in a unit of the number of copies.

In S1302, the print conversion utility 204 determines whether the print apparatus 102 supports the function of copying the designated number of copies. If the print apparatus supports the function of copying the designated number of copies, the process proceeds to S1303, and if the print apparatus does not support the function, the process proceeds to S1306. In this example, the process proceeds to S1303 since the print apparatus 102 has the function of copying the designated number of copies in the print apparatus.

In S1303, the print conversion utility 204 determines whether the collation setting of the print job obtained from the OS print module 202 is a function that the print apparatus 102 can process. If the print job obtained from the OS print module 202 is a function that the print apparatus 102 can process, the process proceeds to S1304, and if it is not, the process proceeds to S1306. In this example, the process proceeds to S1304 since the collation setting of the print job is setting of performing collation printing, and the print apparatus has the function of collation printing in a unit of copies.

In S1304, the print conversion utility 204 determines the number of copies to be printed, and if the number of copies to be printed is two copies or greater, the process proceeds to S1305, and if it is one copy, the process proceeds to S1306. In this example, the process proceeds to S1305 since the total number of pages of the print data is four pages, and the number of copies to be printed is determined as "2" as the number of print sides of each copy is "2".

In S1305, the print conversion utility 204 reconfigures print data of a copy by using the collation setting and the number of print sides of the print job obtained from the OS print module 202. In this case, the collation setting of the print job is collation printing, and the number of print sides of each copy is "2". The print apparatus 102 supports the function of copying the designated number of copies. Accordingly, even without transmitting the expanded print data of all the total number of pages to the print apparatus 102, it is possible to obtain a similar print result with the print apparatus 102 performing collation printing of multiple number of copies by using the print data of one copy. Hence, in S1305, the print conversion utility 204 reconfigures the print data by using the data 1201 of the first page and the data 1202 of the second page of the print data obtained from the OS print module 202 illustrated in FIG. 12.

Figure 14:
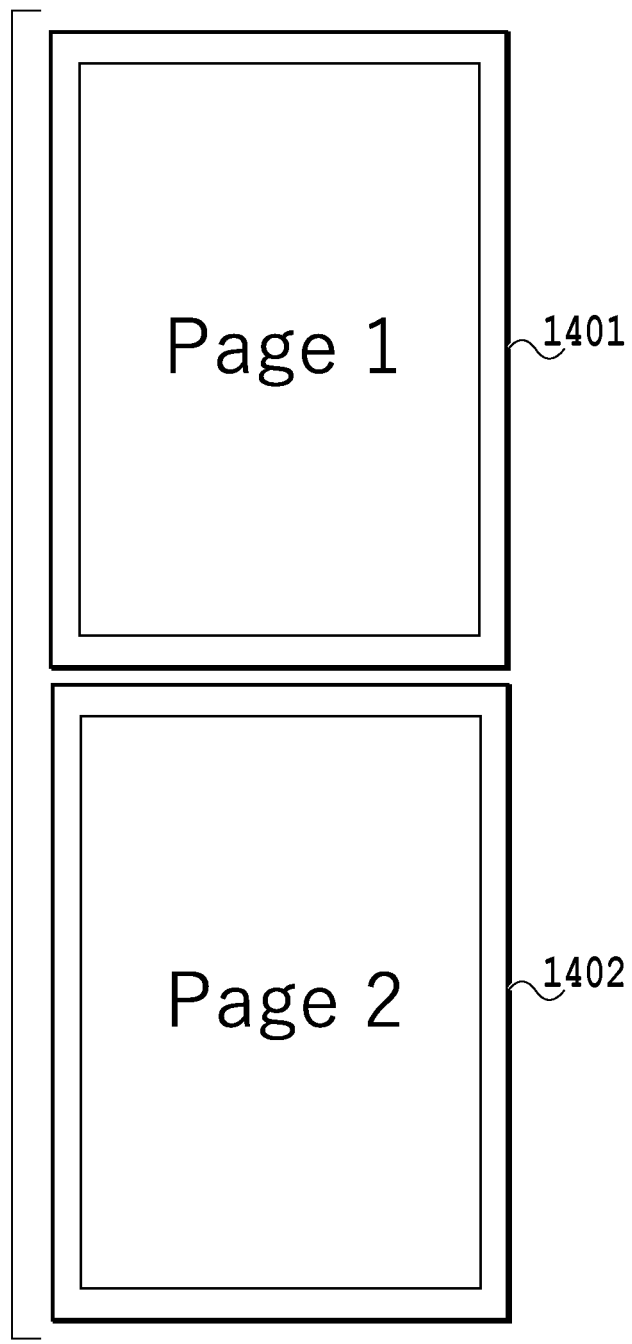
FIG. 14 is a diagram illustrating an example of reconfiguration of the print data.

FIG. 14 is a diagram illustrating an example where the print conversion utility 204 reconfigures the data 1201 of the first page and the data 1202 of the second page of the print data illustrated in FIG. 12. As illustrated in FIG. 14, the print conversion utility 204 generates the print data of two pages in total. Reconfigured data 1401 of the first page is the same as the data 1201 of the first page of the print data obtained from the OS print module 202. Data 1402 of the second page is the same as the data 1202 of the second page of the print data obtained from the OS print module 202. Next, the print conversion utility 204 asks the vender print module 205 to perform the print processing by using the reconfigured print data and the determined number of copies to be printed. In this way, with this system, it is possible to perform printing while reducing a communication load during the printing of multiple copies of the print data expanded as raster data by the print apparatus having the function of copying the designated number of copies in the print apparatus. This example is an example of reconfiguring the data 1201 of the first page and the data 1202 of the second page of the print data illustrated in FIG. 12; however, the print data may be reconfigured by using the data 1203 of the third page and the data 1204 of the fourth page of the print data illustrated in FIG. 12.

Another example is described. Here is described processing for a case where the print conversion utility 204 obtains raster data from the OS print module 202 as the print data while the collation printing designation check box 305 is not checked in the print setting dialogue 300.

FIG. 15 is a diagram illustrating an example 1500 of print setting and print data that the print conversion utility 204 obtains from the OS print module 202. The print conversion utility 204 obtains the setting of printing the number of copies in the order of pages without performing collation printing from the multiple-document-handling attribute.

Figure 16:
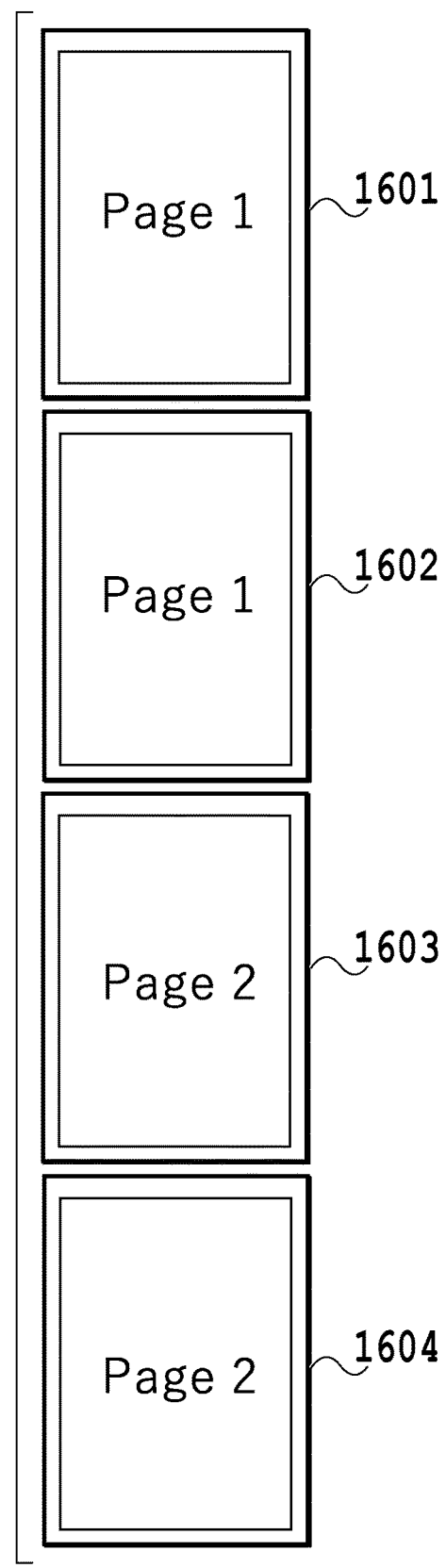
FIG. 16 is a diagram describing the print data.

FIG. 16 is a diagram describing the print data included in FIG. 15. The print data included in FIG. 15 is data to be printed without collating two copies of the data of two pages as illustrated in FIG. 16. Data 1601 is data of the first page of the contents generated by the cooperating application 201 and OS print module 202. Data 1602 is data of the first page of the contents generated by the cooperating application 201 and OS print module 202. Data 1603 is data of the second page of the contents generated by the cooperating application 201 and OS print module 202. Data 1604 is data of the second page of the contents generated by the cooperating application 201 and OS print module 202. The print conversion utility 204 obtains the expanded print data including the four pages in total from the OS print module 202.

As described above, the print apparatus 102 of this example has the collation printing function and can perform the collation output in a unit of the designated number of copies. However, in a case where collation printing is not designated, the print apparatus 102 cannot perform the output of the designated number of copies in the order of pages. Hence, in this example, the print conversion utility 204 determines that the setting of collation printing of the print job does not correspond to the collation printing function of the print apparatus in S1303 of the processing flowchart for raster data in FIG. 13, and the process proceeds to S1306.

In S1306, the print conversion utility 204 asks the vender print module 205 to perform the print processing without reconfiguring the print setting and the print data of the obtained print job. In this way, it is possible to obtain an output result of the printing of the designated number of copies in the order of pages by the print apparatus that does not have the function of printing the designated number of copies in the order of pages.

As described above, according to this embodiment, it is possible to allow the print apparatus not supporting the OS-standard printing function to execute proper print processing using the OS-standard printing function. In other words, it is possible to execute the print processing while inhibiting the processing that causes an increase in a processing load and occupation of a storage region. Additionally, it is possible to perform collation printing in a form that the user desires.

The attribute information obtained by using the OS-standard print protocol is used to obtain the print setting and the print data of the print job from the OS-standard print control component 203 in this embodiment; however, the information may be obtained from meta-data and the like included in the print data. Additionally, in this embodiment, the print conversion utility 204 switches the processing for the case of vector data and the processing for the case of raster data depending on the file format of the print data obtained from the OS print module 202 in S602. In a case where the OS print module 202 outputs one type of print data format, processing of a default data format may be executed without making the determination in S602.

Second Embodiment

In this embodiment, a method of allowing a print apparatus not supporting the OS-standard printing function to perform two-sided printing of contents including multiple pages using the OS-standard printing function is described. Portions with no descriptions hereinafter are similar to that in the first embodiment.

Example of Performing Two-Sided Printing

In this embodiment, descriptions are given with the assumption that a print apparatus not supporting the OS-standard printing function that is supported by the print conversion utility 204, "Company C Printer 2", is connected to the print system as the print apparatus 102. Additionally, it is assumed that the print apparatus 102 not supporting the OS-standard printing function has a capability of setting the following functions. (1) The print apparatus has a function of accepting a designation of the number of copies and copying the designated number of copies of print data in the print apparatus. (2) The print apparatus has a collation printing function and can perform collation printing in a unit of the designated number of copies but cannot perform an output of the designated number of copies in the order of pages if collation printing is not designated. (3) The print apparatus has a two-sided printing function and can perform a two-sided printing output of short-edge binding by accepting designation of the two-sided printing function. (4) The print apparatus supports sheet sizes of A4 and letter-size and has a function of receiving print data corresponding to the sheet sizes and performing printing for the sheet sizes. (5) The print apparatus supports sheet types of plain paper and a photo sheet and has a function of performing printing on a paper surface of a designated type of sheet. (6) The print apparatus includes only a main tray as a paper feed port.

First, the print conversion utility 204 makes notification so that the print apparatus not supporting the OS-standard printing function, "Company C Printer 2", can be discovered by the OS print module 202 as the print apparatus supporting the OS-standard printing function. The method of notification is made by the Bonjour protocol, as described above. In a case where obtaining of settable printing information of the print apparatus not supporting the OS-standard printing function, "Company C Printer 2", is requested by the OS print module 202, the print conversion utility 204 answers on behalf of the print apparatus. The method of answering on behalf of the print apparatus includes to answer the settable printing information of the print apparatus not supporting the OS-standard printing function, "Company C Printer 2", by using the IPP protocol, as described above. Additionally, the following descriptions are given with the assumption that, in a case where the OS print module 202 inquiries about a print data format as the settable printing information, the print conversion utility 204 answers PWG Raster Format and PDF.

Once receiving the printing request from the user, the application 201 issues the printing instruction to the OS. Once receiving the printing instruction, the OS print module 202 provides the application 201 with the print setting screen configured to display the list of the available print apparatus supporting the OS-standard printing function and the print setting that can be set for the print apparatus and the set values thereof.

FIG. 17 is an example of the print setting screen that the OS print module 202 provides to the application 201. In this embodiment, it is assumed that the print apparatus not supporting the OS-standard printing function, "Company C Printer 2" is being selected, and the OS print module 202 obtains the settable printing information of the print apparatus by using the IPP protocol according to the procedure similar to that of the first embodiment.

FIG. 18 is a diagram illustrating an example 1800 of the request of the settable printing information and the answer. FIG. 18 is a diagram illustrating an example of operations and attribute data for a case where the OS print module 202 requests the settable printing information of "Company C Printer 2" from the print conversion utility 204 and the print conversion utility 204 answers on behalf of the print apparatus. In this embodiment, the print conversion utility 204 answers attribute information indicating that the print apparatus 102 supports one-sided printing and two-sided printing and that the two-sided printing means two-sided printing of short-edge binding. Specifically, "one-sided" and "two-sided-short-edge" are answered to "sides-supported". Additionally, regarding the default two-sided printing function of the print apparatus, the print conversion utility 204 answers "one-sided" indicating that the printing is one-sided printing to "sides-default".

In a case where the obtained attribute information "sides-supported" corresponds to two-sided printing, the OS print module 202 displays a two-sided printing control 1703. While a check box of the two-sided printing control 1703 is checked, the user can select a radio button for selecting long-edge binding or short-edge binding. Although in a case where the print apparatus supports two-sided printing but has only either function of long-edge binding and short-edge binding, the OS print module 202 may provide a control that allows selecting of both the functions of long-edge binding and short-edge binding.

It is assumed that the contents of this embodiment are the same as the contents described in the first embodiment. The contents of this embodiment are the contents created by the application 201 and includes the two pages in total, which are the contents 501 on the first page and the contents 502 on the second page, as illustrated in FIG. 5. It is assumed that the contents are created by the application 201, and a print button 1710 in a print setting dialogue 1700 illustrated in FIG. 17 is pressed.

Figure 20C:
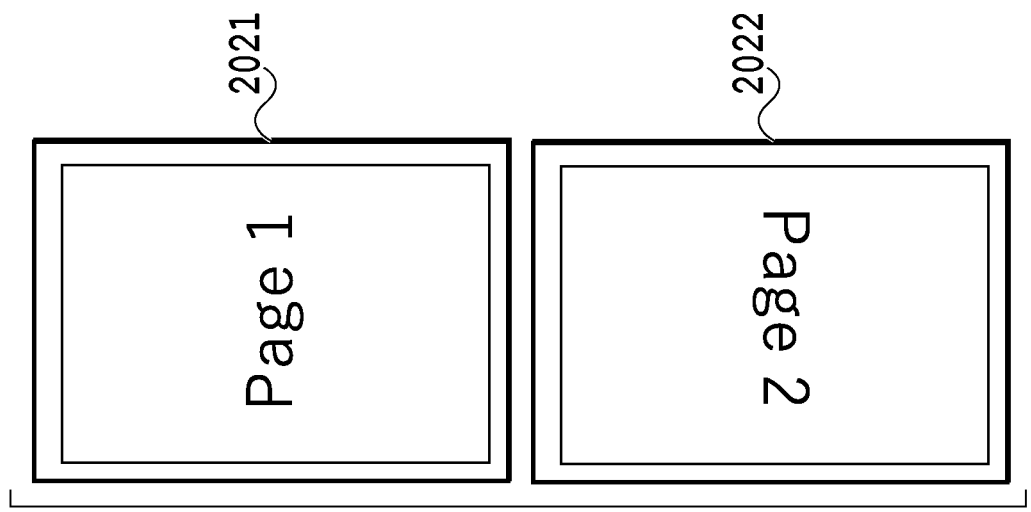
FIGS. 20A to 20C are diagrams describing the print data.
Figure 20B:
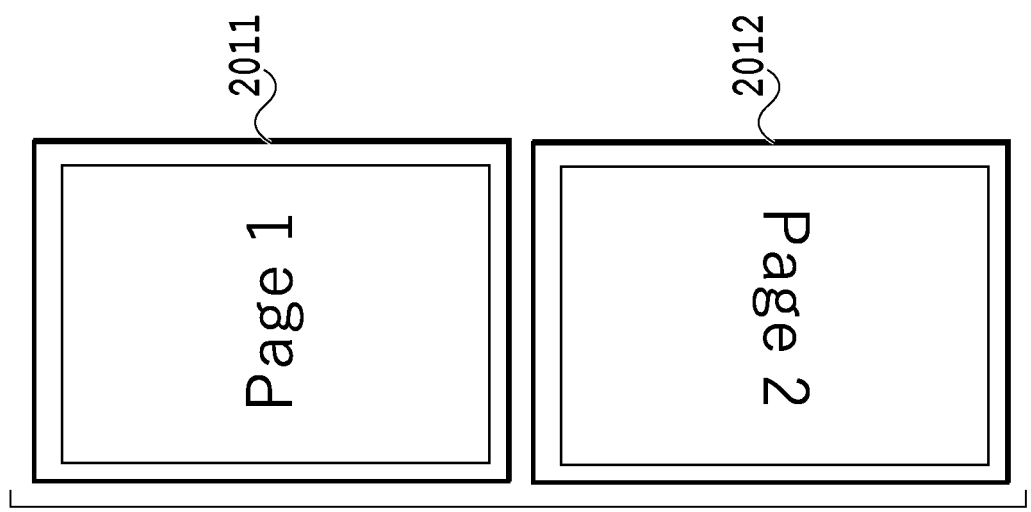
Figure 20A:
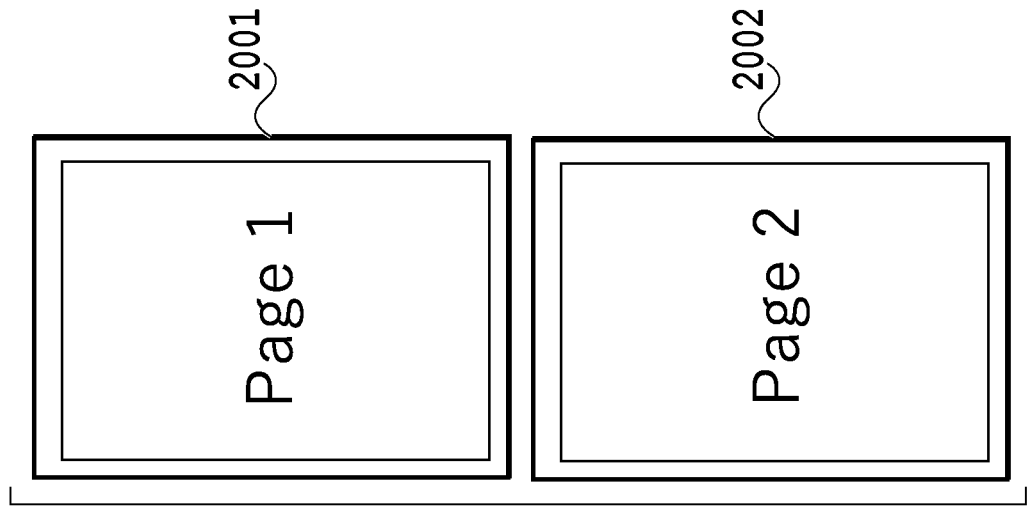

FIG. 19 is an example 1900 of print setting and print data that the print conversion utility 204 receives from the OS print module 202 by using the OS-standard print protocol. FIGS. 20A to 20C are diagrams illustrating an example of the print data of this embodiment.

In this embodiment, PDF in a vector data format illustrated in FIG. 20A is transmitted by the OS print module 202. Data 2001 is data of the contents on the first page generated by the cooperating application 201 and OS print module 202. Data 2002 is data of the contents on the second page generated by the cooperating application 201 and OS print module 202.

The print conversion utility 204 in this embodiment also executes the print processing through the processing indicated in FIG. 6. In this embodiment, the print conversion utility 204 makes a determination on a print data format in S602, and since it is PDF in a vector data format, the print conversion utility 204 executes the processing of S603.

Example of Processing of Vector Data

Figure 21:
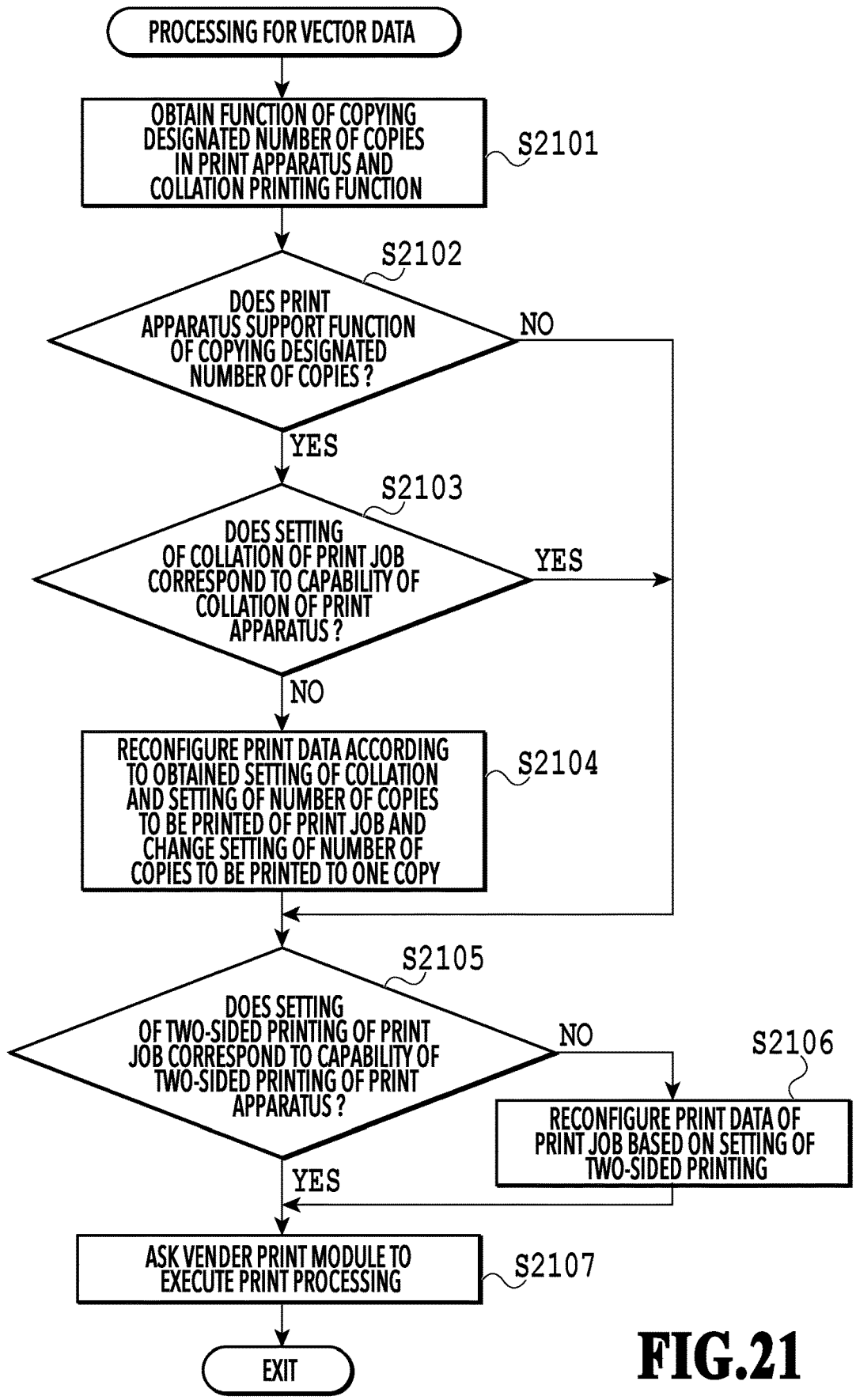
FIG. 21 is a flowchart of processing for vector data by the print conversion utility in two-sided printing.

FIG. 21 is processing for vector data supporting two-sided printing. The print conversion utility 204 executes the processing starting from S2101. In this case, since the processing from S2101 to S2104 is similar to that from S801 to S803, and S805 in the first embodiment, descriptions thereof are omitted. Specifically, in S2104, if there is any change in the print data and the print setting like S805 the processing described later is executed on the changed print data and print setting.

In S2105, the print conversion utility 204 determines whether the setting of two-sided printing of the print job obtained from the OS print module 202 supports the capability of two-sided printing of the print apparatus. In this case, the process proceeds to S2106 since long-edge binding corresponding to two-sided-long-edge is set to the setting of two-sided printing of the print job but the print apparatus does not support an output of long-edge binding.

In S2106, the print conversion utility 204 reconfigures the print data based on the setting of double-side printing of the print job obtained from the OS print module 202. In this case, the following descriptions are given with the assumption that the print apparatus of this embodiment that supports an output of short-edge binding in two-sided printing can obtain the same output result as an output of long-edge binding in a case where the data on an even-numbered page is rotated 180 degrees in the two-sided printing (in output of short-edge binding).

FIG. 20B is a diagram illustrating an example of the reconfiguration performed by the print conversion utility 204. In S2106, the print conversion utility 204 reconfigures the print data as illustrated in FIG. 20B. Data 2011 is print data of the first page reconfigured by the print conversion utility 204, and data 2012 is print data on the second page reconfigured by the print conversion utility 204. That is, with the data 2002 on the even-numbered page of the print data in FIG. 20A being rotated 180 degrees, it is possible to obtain the same output result as an output of long-edge binding that the print apparatus in this embodiment does not support. Specifically, with the reconfigured print data illustrated in FIG. 20B being printed by the print apparatus supporting an output of short-edge binding in two-sided printing, it is possible to obtain a similar print result as that of a case where the print data illustrated in FIG. 20A is outputted as long-edge binding.

Next, in S2107, the print conversion utility 204 asks the vender print module 205 to execute the print processing to perform printing in the print apparatus 102. This makes it possible to perform printing with proper print setting in the print apparatus having either the function of an output of short-edge binding or an output of long-edge binding for setting of two-sided printing, even in a case where setting of two-sided printing that the print apparatus does not support is set for printing by the print apparatus.

Example of Processing of Raster Data

Next, in this embodiment, an example of a case where the OS print module 202 outputs print data in a raster data format as print data once the print button 1710 in the print setting dialogue 1700 illustrated in FIG. 17 is pressed is described.

FIG. 22 is a diagram illustrating an example 2200 of print setting and print data that the print conversion utility 204 receives from the OS print module 202 by using the OS-standard print protocol. A data format of the print data is PWG Raster Format, and the process proceeds to S604 once the print conversion utility 204 makes a determination on the print data format in S602 of the print processing illustrated in FIG. 6.

Thereafter, the print conversion utility 204 executes the processing for raster data indicated in FIG. 13. In this case, the print data that the print conversion utility 204 receives corresponds to the data that the print apparatus supporting the two-sided printing function outputs, as illustrated in FIG. 20C. Specifically, in a case where the print data is outputted in a raster data format, the OS print module 202 transmits the data that the print apparatus outputs by using the supported two-sided printing function as the print data to the print conversion utility 204. Accordingly, the print data that the print conversion utility 204 receives includes data 2022 of the second page rotated 180 degrees. Consequently, the print conversion utility 204 does not have to execute the print data reconfiguration processing to support the two-sided printing function. Therefore, even in two-sided printing, it is possible to perform printing with proper print setting by the print apparatus not supporting the OS-standard printing function, by executing the processing for raster data of the first embodiment illustrated in FIG. 13 and using the OS-standard printing function.

In this embodiment, here is described, as with the first embodiment, an example where the print apparatus 102 has the collation printing function and can perform the collation output in a unit of the designated number of copies but cannot perform an output of the designated number of copies in the order of pages if the collation printing is not designated. However, the configuration is not limited to this example. The print apparatus may have the two-sided printing function but no collation printing function. Otherwise, the print apparatus may be an apparatus that has the collation printing function and can perform both the collation output in a unit of the designated number of copies and output of the designated number of copies in the order of pages. In this case, the processing in FIG. 21 may be started from S2105.

Third Embodiment

Example of Performing Printing Using Cloud Print Service

In this embodiment, an example of using a cloud print service provided on the Internet and printing is performed with proper print setting by a print apparatus not supporting the cloud print service is described.

Figure 23:
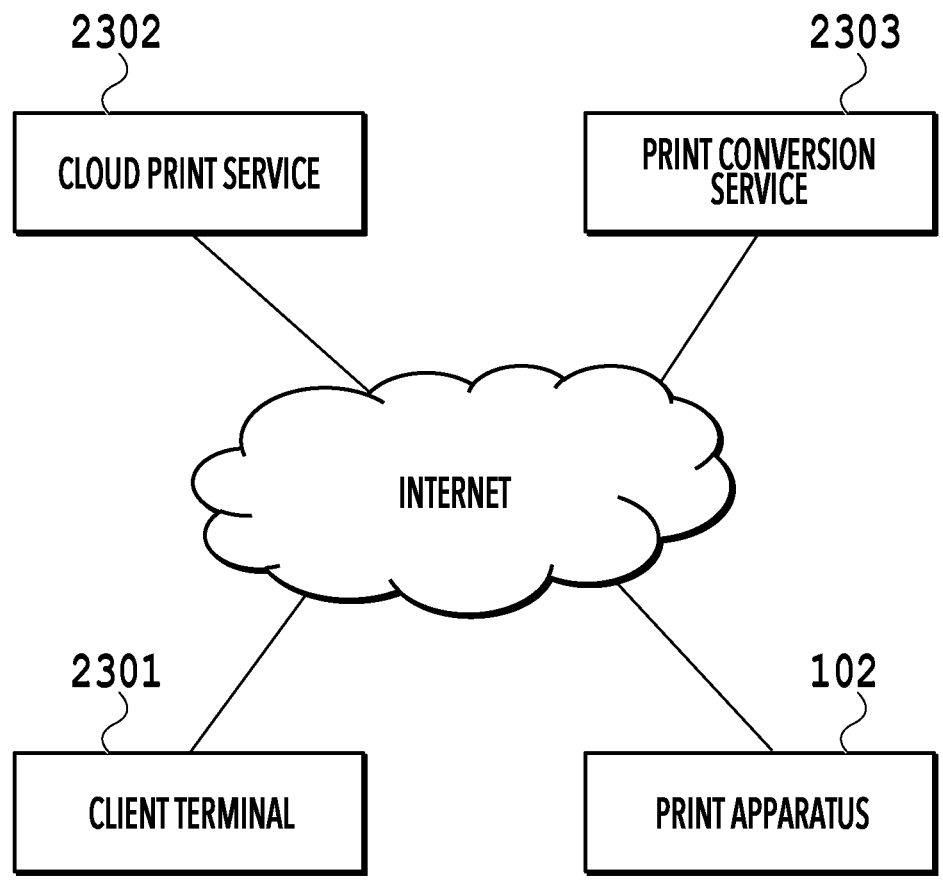
FIG. 23 is a block configuration diagram of a print system that uses a cloud print service to perform printing.

FIG. 23 is a diagram illustrating an example of a configuration of a print system of this embodiment. The print system includes a print apparatus 102, a client terminal 2301, a cloud print service 2302, and a print conversion service 2303. The cloud print service 2302 and the print conversion service 2303 are included in (not-illustrated) servers providing the services, respectively. The print apparatus 102 is a print apparatus not supporting the cloud print service 2302. This embodiment is an example where the client terminal 2301 connected to the Internet causes the print apparatus 102 to perform printing using the cloud print service 2302 provided on the Internet.

The print conversion service 2303 is a service to convert print data that the cloud print service 2302 provides into a print data format that the print apparatus 102 not supporting the cloud print service 2302 can print. This conversion service is operated in an environment where a connection with the cloud print service 2302 on the Internet can be made through the Internet. The conversion service may be an application that is operated on the client terminal 2301 such as a PC or a smartphone that is connected to the Internet. The print conversion service 2303 communicates with the cloud print service 2302 by using a protocol that the cloud print service 2302 supports. The print conversion service 2303 also communicates with the print apparatus 102 by using a protocol that the print apparatus 102 supports and interconverts the protocol. A widely known examples of the cloud print service 2302 are Google Cloud Print (registered trademark) of Google (registered trademark) and print services provided by print apparatus venders.

Information on the print apparatus 102 that performs printing is registered in the cloud print service 2302 in advance. In this example, the information on the print apparatus 102 not supporting the cloud print service 2302 is registered in the cloud print service 2302 through the print conversion service 2303. The information on the print apparatus 102 includes the capability of the print apparatus. In this case, descriptions of a user who instructs printing by using the client terminal 2301 and a method of authentication between the cloud print service 2302 and the print conversion service 2303 are omitted.

As described above, the cloud print service 2302 is a service corresponding to the OS print module described in the first embodiment, and the print conversion service 2303 is a service corresponding to the print conversion utility 204.

The user makes an instruction by using the client terminal 2301, and the client terminal 2301 or a not-illustrated service on the Internet providing print contents provides the cloud print service 2302 with print contents. It is assumed that the cloud print service 2302 provides a function that allows the user to select print setting based on the information on the capability of the print apparatus 102 performing printing that is obtained from the print conversion service 2303. For example, if the printing apparatus is the one having the same capability as that of the print apparatus 102 in the above-described first embodiment, the user can select the collation printing function.

Once receiving print setting from the user, the cloud print service 2302 transmits the print data and the print setting to the print conversion service 2303. Descriptions of a communication protocol of the print setting and the print data between the cloud print service 2302 and the print conversion service 2303 are omitted herein. Note that, the IPP described in the first embodiment may be used. Thereafter, the print conversion service 2303 executes print processing indicated in FIG. 24.

Figure 24:
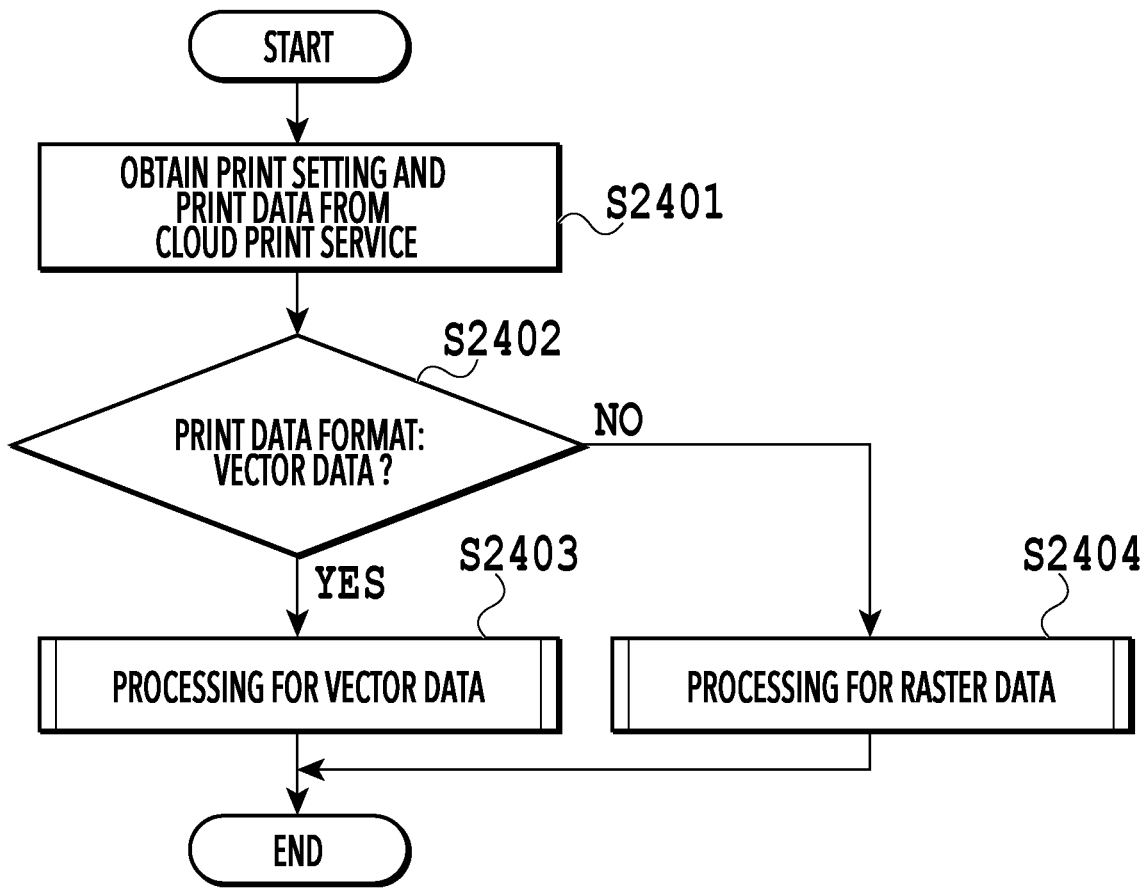
FIG. 24 is a flowchart indicating an example of print processing executed by a print conversion service.

FIG. 24 is a flowchart indicating an example of the print processing executed by the print conversion service 2303. In S2401, the print conversion service 2303 obtains the print setting and the print data from the cloud print service 2302. Thereafter, the print conversion service 2303 makes a determination on the obtained print data format (S2402), and if the print data format is a vector data format, the process proceeds to S2403, and if the print data format is a raster data format, the process proceeds to S2404.

In this case, in the processing for vector data in S2403, printing is performed with proper print setting by the print apparatus 102 through a not-illustrated vender print module in the print conversion service 2303 by using the processing for vector data in FIG. 8 described in the first embodiment. On the other hand, in the processing for raster data in S2404, printing is performed with proper print setting by the print apparatus 102 through the not-illustrated vender print module in the print conversion service 2303 by using the processing for raster data in FIG. 13 described in the first embodiment.

As described above, according to this embodiment, it is possible to allow the print apparatus 102 not supporting the cloud print service 2302 to perform printing with proper print setting using the cloud print service 2302. Additionally, as described in the second embodiment, also in a case of two-sided printing, it is possible to perform printing with proper print setting similarly in the print system of this embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-239152, filed Dec. 27, 2019, which is hereby incorporated by reference herein in its entirety.

What is claimed is:

1. A method of controlling an information processing apparatus configured to convert data received from a first print module into data appropriate for a print apparatus not supporting the first print module, comprising the steps of:
   obtaining first print data and first print setting from the first print module as a first obtainment step;
   controlling whether the obtained first print data and the obtained first print setting are outputted to the print apparatus or print data different from the obtained first print data and print setting different from the obtained first print setting are outputted to the print apparatus according to whether the obtained first print data is raster data or vector data and according to a content of setting relating to collation printing for printing in a collated manner included in the obtained first print setting;
   generating, as the print data different from the obtained first print data and the print setting different from the obtained first print setting, print data and print setting having contents differing according to whether the obtained first print data is raster data or vector data and according to the content of the setting relating to the collation printing included in the obtained first print setting; and
   outputting, to the print apparatus, the obtained first print data and the obtained first print setting or the print data different from the obtained first print data and the print setting different from the obtained first print setting.

2. The method of controlling the information processing apparatus according to claim 1, wherein
   the first print setting includes setting of the number of copies,
   whether the obtained first print data and the obtained first print setting are outputted to the print apparatus or the print data different from the obtained first print data and the print setting different from the obtained first print setting are outputted to the print apparatus is controlled further according to capability of the print apparatus, and
   the capability of the print apparatus includes information on a collation printing function and a function of copying designated number of copies in the print apparatus.

3. The method of controlling the information processing apparatus according to claim 2, wherein
   on the basis that the first print data is vector data and the setting relating to the collation printing included in the first print setting does not correspond to the capability relating to the collation printing function of the print apparatus,
   control is performed such that the print data different from the obtained first print data and the print setting different from the obtained first print setting are outputted to the print apparatus.

4. The method of controlling the information processing apparatus according to claim 3, wherein
   on the basis that the first print data is vector data, the first print setting includes the setting relating the collation printing, and the print apparatus does not have the function of copying a designated number of copies,
   control is performed such that the print data different from the obtained first print data and the print setting different from the obtained first print setting are outputted to the print apparatus.

5. The method of controlling the information processing apparatus according to claim 3, wherein
   on the basis that the first print data is vector data and the setting relating to the collation printing included in the first print setting does not support the collation printing function of the print apparatus,
   the print data different from the obtained first print data is generated such that each of a plurality of pages included in the first print data is present in a number corresponding to the setting of the number of copies included in the first print setting, and
   the print setting different from the obtained first print setting is generated such that the setting of the number of copies indicates one copy.

6. The method of controlling the information processing apparatus according to claim 2, wherein
   on the basis that the first print data is raster data and the first print setting includes the setting relating to the collation printing,
   control is performed such that the print data different from the obtained first print data and the print setting different from the obtained first print setting are outputted to the print apparatus.

7. The method of controlling the information processing apparatus according to claim 6, wherein
   in a case where the first print module obtains predetermined data which is raster data, which has the first print setting including setting relating to the collation printing for printing in a collated manner, and for which setting of the number of copies for printing multiple copies is made, the first print module generates, as the first print data, data which is raster data and in which a plurality of pages included in the predetermined data are collated and expanded in a number corresponding to the setting of the number of copies, and generates, as the first print setting, print setting including setting of the number of copies for printing one copy, and on the basis that the first print data is raster data and the first print setting includes the setting relating to the collation printing, data which is raster data and in which the plurality of pages are not expanded is generated as the print data different from the obtained first print data, and print setting including setting of the number of copies identical to the setting of the number of copies made for the predetermined data is generated as the print setting different from the obtained first print setting.

8. The method of controlling the information processing apparatus according to claim 1, wherein the first print setting includes setting of two-sided printing, and capability of the print apparatus includes information on a two-sided printing function.

9. The method of controlling the information processing apparatus according to claim 8, wherein in a case where the first print data is raster data while capability of the print apparatus does not support the two-sided printing function, control is performed such that the print data different from the obtained first print data and the print setting different from the obtained first print setting are outputted to the print apparatus.

10. The method of controlling the information processing apparatus according to claim 1, wherein a second print module outputs, to the print apparatus, the obtained first print data and the obtained first print setting or the print data different from the obtained first print data and the print setting different from the obtained first print setting, and the first print module is provided in a first apparatus, the second print module is provided in the information processing apparatus connected with the first apparatus through a network, and the print apparatus is connected with the information processing apparatus through the network.

11. The method of controlling the information processing apparatus according to claim 1, wherein the first print module is a module using the Internet Print Protocol (IPP).

12. The method of controlling the information processing apparatus according to claim 1, wherein the first obtainment step, the step of controlling, the step of generating, and the step of outputting are executed by a second print module, which is a module different from the first print module and provided in the information processing apparatus.

13. The method of controlling the information processing apparatus according to claim 1, wherein the first print setting is set on a print setting screen provided by the first print module.

14. The method of controlling the information processing apparatus according to claim 1, wherein on the basis that the first print data is vector data and the setting relating to the collation printing included in the first print setting corresponds to the capability relating to the collation printing of the print apparatus, control is performed such that the obtained first print data and the obtained first print setting are outputted to the print apparatus.

15. The method of controlling the information processing apparatus according to claim 1, wherein on the basis that the first print data is raster data and the setting relating to the collation printing included in the first print setting does not correspond to the capability relating to the collation printing of the print apparatus, control is performed such that the obtained first print data and the obtained first print setting are outputted to the print apparatus.

16. The method of controlling the information processing apparatus according to claim 1, wherein whether the obtained first print data and the obtained first print setting are outputted to the print apparatus or the print data different from the obtained first print data and the print setting different from the obtained first print setting are outputted to the print apparatus is controlled according to whether the obtained first print data is raster data or vector data, the content of the setting relating to the collation printing for printing in a collated manner included in the obtained first print setting, and capability of the print apparatus.

17. The method of controlling the information processing apparatus according to claim 1, further comprising the step of obtaining information on capability of the print apparatus from the print apparatus as a second obtainment step.

18. An information processing apparatus configured to convert data received from a first print module into data appropriate for a print apparatus not supporting the first print module, comprising:

at least one processor, wherein the least one processor executes the steps of:

obtaining first print data and first print setting from the first print module as a first obtainment step;

controlling whether the obtained first print data and the obtained first print setting are outputted to the print apparatus or print data different from the obtained first print data and print setting different from the obtained first print setting are outputted to the print apparatus according to whether the obtained first print data is raster data or vector data according to a content of setting ef relating to collation printing for printing in a collated manner included in the obtained first print setting;

generating, as the print data different from the obtained first print data and the print setting different from the obtained first print setting, print data and print setting having contents differing according to whether the obtained first print data is raster data or vector data and according to the content of the setting relating to the collation printing included in the obtained first print setting; and outputting, to the print apparatus, the obtained first print data and the obtained first print setting or the print data different from the obtained first print data and the print setting different from the obtained first print setting.

19. A non-transitory computer readable storage medium storing a program which causes a computer to perform a method of controlling an information processing apparatus, which is a method of controlling an information processing apparatus configured to convert data received from a first print module into data appropriate for a print apparatus not supporting the first print module, comprising the steps of:

obtaining first print data and first print setting from the first print module as a first obtainment step;

controlling whether the obtained first print data and the obtained first print setting are outputted to the print apparatus or print data different from the obtained first print data and print setting different from the obtained first print setting are outputted to the print apparatus according to whether the obtained first print data is raster data or vector data and according to a content of setting relating to collation printing for printing in a collated manner included in the obtained first print setting;

generating, as the print data different from the obtained first print data and the print setting different from the obtained first print setting, print data and print setting having contents differing according to whether the obtained first print data is raster data or vector data and according to the content of the setting relating to the collation printing included in the obtained first print setting, and outputting, to the print apparatus, the obtained first print data and the obtained first print setting or the print data different from the obtained first print data and the print setting different from the obtained first print setting.

* * * * *